US010371507B2

(12) United States Patent
Nakamura

(10) Patent No.: US 10,371,507 B2
(45) Date of Patent: Aug. 6, 2019

(54) SHAPE MEASUREMENT DEVICE, STRUCTURAL OBJECT PRODUCTION SYSTEM, SHAPE MEASUREMENT METHOD, STRUCTURAL OBJECT PRODUCTION METHOD, SHAPE MEASUREMENT PROGRAM, AND RECORDING MEDIUM

(71) Applicant: NIKON CORPORATION, Tokyo (JP)

(72) Inventor: Yu Nakamura, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/905,399

(22) PCT Filed: Jul. 17, 2014

(86) PCT No.: PCT/JP2014/069007
§ 371 (c)(1),
(2) Date: Jan. 15, 2016

(87) PCT Pub. No.: WO2015/008820
PCT Pub. Date: Jan. 22, 2015

(65) Prior Publication Data
US 2016/0161250 A1 Jun. 9, 2016

(30) Foreign Application Priority Data
Jul. 19, 2013 (JP) ................. 2013-151152

(51) Int. Cl.
*G01B 11/25* (2006.01)
*G01B 11/24* (2006.01)
(52) U.S. Cl.
CPC ...... *G01B 11/2513* (2013.01); *G01B 11/2416* (2013.01); *G01B 11/25* (2013.01); *G01B 11/2518* (2013.01); *G01B 2210/54* (2013.01)

(58) Field of Classification Search
CPC . G01B 11/2513; G01B 11/2518; G01B 11/25; G01B 11/24; G01B 11/2522;
(Continued)

(56) References Cited
U.S. PATENT DOCUMENTS 4,370,058 A * 1/1983 Trotscher ........... G01M 11/0228
356/125
4,547,674 A 10/1985 Pryor et al.
(Continued)

FOREIGN PATENT DOCUMENTS

CN 103180691 A 6/2013
DE 4142676 A1 7/1993
(Continued)

OTHER PUBLICATIONS

Espacenet English Translation of JP2009198342 A.*
(Continued)

*Primary Examiner* — Mohamed K Amara
(74) *Attorney, Agent, or Firm* — Finnegan, Henderson, Farabow, Garrett & Dunner, LLP

(57) ABSTRACT

The purpose of the present invention is to more quickly and easily measure the shape of an object to be measured. A shape measurement device includes: a probe including a projection optical system that projects a line-shaped pattern onto a surface of the object to be measured or projects a spot pattern while scanning in at least a linear scanning range, and an image capturing device that detects an image of the pattern projected onto the object to be measured; a movement mechanism that rotates the object to be measured and the probe relative to each other so that the object to be measured rotates relative to the probe around a rotation axis and moves at least one of the probe and the object to be measured relatively in a direction that intersects with a rotation direction in which the object to be measured rotates;
(Continued)

a measurement region setting unit that sets a measurement region of the object to be measured; and an actual measurement region setting unit that sets an actual measurement region including an actual measurement start position and an actual measurement end position on the basis of the measurement region set by the measurement region setting unit. The actual measurement region setting unit sets whichever of the actual measurement start position and the actual measurement end position is closer to a rotation axis center to be closer to the rotation axis than the measurement region, or sets whichever of the actual measurement start position and the actual measurement end position is located further outward in the radial direction to be further from the rotation axis than the measurement range.

36 Claims, 31 Drawing Sheets

(58) Field of Classification Search
CPC ............ G01B 11/2545; G01B 2210/54; G01B 5/0004; G01B 11/2408; A61C 13/34; A61C 9/0093; A61C 9/006; H04N 13/0203; H04N 7/18; G06T 7/0057; G06T 7/521; Y10T 29/497
See application file for complete search history.

(56) References Cited

U.S. PATENT DOCUMENTS

| | | | | | |
|---|---|---|---|---|---|
| 5,042,945 | A | * | 8/1991 | Shibata | G03F 1/22 356/150 |
| 5,461,478 | A | * | 10/1995 | Sakakibara | G01B 11/2513 356/623 |
| 5,973,772 | A | * | 10/1999 | Fukuma | G01M 11/0235 33/200 |
| 6,075,605 | A | * | 6/2000 | Futamura | G01B 11/2518 250/559.22 |
| 6,393,141 | B1 | * | 5/2002 | Cronshaw | G01B 11/25 382/141 |
| 7,375,826 | B1 | * | 5/2008 | Lavelle | G01B 11/2518 356/606 |
| 8,224,064 | B1 | * | 7/2012 | Hassebrook | G01B 11/2513 382/154 |
| 9,239,219 | B2 | | 1/2016 | Kanto | |
| 2009/0268199 | A1 | * | 10/2009 | Inoguchi | G01B 11/24 356/124 |
| 2010/0314002 | A1 | * | 12/2010 | Giudiceandrea | B27B 1/00 144/359 |
| 2011/0043803 | A1 | * | 2/2011 | Nygaard | G01B 11/2425 356/399 |
| 2011/0270562 | A1 | * | 11/2011 | Ito | G01B 11/25 702/94 |
| 2013/0050712 | A1 | * | 2/2013 | Samukawa | G01B 11/24 356/612 |
| 2013/0133168 | A1 | * | 5/2013 | Yamaguchi | G01B 11/2416 29/407.04 |
| 2013/0163718 | A1 | * | 6/2013 | Lindenberg | G01B 11/25 378/39 |
| 2013/0215258 | A1 | * | 8/2013 | Gaglin | H04N 7/18 348/87 |
| 2013/0298415 | A1 | | 11/2013 | Kanto | |
| 2014/0168414 | A1 | * | 6/2014 | Brumovsky | G06T 7/0057 348/92 |
| 2014/0368614 | A1 | * | 12/2014 | Imai | H04N 13/0246 348/47 |
| 2015/0042787 | A1 | * | 2/2015 | Douglas | G01M 1/326 348/95 |
| 2016/0008111 | A1 | * | 1/2016 | Jumpertz | A61C 9/006 348/46 |
| 2016/0161250 | A1 | * | 6/2016 | Nakamura | G01B 11/2518 356/610 |
| 2017/0046854 | A1 | * | 2/2017 | Sugihara | G01C 15/06 |
| 2017/0052024 | A1 | * | 2/2017 | Reece, Jr. | G01B 11/2518 |
| 2017/0191822 | A1 | * | 7/2017 | Becker | H05K 999/99 |

FOREIGN PATENT DOCUMENTS

| | | | | |
|---|---|---|---|---|
| JP | 8-25092 | | 3/1996 | |
| JP | 2009198342 | A * | 9/2009 | ............. G01B 11/24 |
| JP | 2013-246151 | | 12/2013 | |
| JP | 2013246151 | A * | 12/2013 | ............. G01B 11/24 |
| JP | WO 2014156723 | A1 * | 10/2014 | ............. G01B 11/25 |
| WO | WO 2012/057008 | A1 | 5/2012 | |
| WO | WO 2012/057283 | A1 | 5/2012 | |

OTHER PUBLICATIONS

International Search Report issued by the Japanese Patent Office in counterpart International Application No. PCT/JP2014/069007, dated Oct. 28, 2014 (5 pages).
Office Action issued by Japanese Patent Office in counterpart Japanese Patent Application No. JPA 2015-527329 dated Jun. 14, 2016, and English Translation thereof.
Extended European Search Report issued by the European Patent Office in corresponding European Application No. 14826285.0, dated Feb. 17, 2017 (6 pages).
Office Action issued by the State Intellectual Property Office of the People's Republic of China dated Aug. 3, 2017 in a counterpart Application No. 201480040836.2, and English translation thereof.

\* cited by examiner

SHAPE MEASUREMENT DEVICE, STRUCTURAL OBJECT PRODUCTION SYSTEM, SHAPE MEASUREMENT METHOD, STRUCTURAL OBJECT PRODUCTION METHOD, SHAPE MEASUREMENT PROGRAM, AND RECORDING MEDIUM

CROSS REFERENCE TO RELATED APPLICATIONS

This is the national stage of international application No. PCT/JP2014/069007 filed on Jul. 17, 2014, which claims priority to Japanese Patent Application No. 2013-151152 filed on Jul. 19, 2013. The contents of the aforementioned applications are incorporated herein by reference in their entirety.

BACKGROUND

The present invention relates to a shape measurement device, a structural object production system, a shape measurement method, a structural object production method, a shape measurement program, and a recording medium.

A shape measurement device that uses a contact sensor to measure a surface shape of a measurement target having a complex shape, such as a gear or a turbine, is known. This shape measurement device measures the surface shape of the measurement target by converting a position of the contact sensor, which is in contact with the surface of the measurement target, into spatial coordinates on the surface of the measurement target (see Japanese Examined Patent Publication No. H08-025092B, for example).

SUMMARY OF EMBODIMENTS

Technical Problem

It is possible that shape measurement devices make a measurement in a shorter period of time. However, the shape measurement device disclosed in Japanese Examined Patent Publication No. H08-025092B repeatedly causes the contact sensor to come into contact with the surface of the measurement target, which requires a longer period of time for measurement. Due to this, the number of measurement points cannot be increased.

Here, examples of a shape measurement device include a shape measurement device that employs a method such as a light-section method in which a light flux having a light quantity distribution producing a predetermined pattern is projected onto an object to be measured, and the shape of the light flux projected on the object is measured to obtain the shape of the object to be measured. The shape measurement device that employs a method such as the light-section method can measure shapes without contact, which makes it possible to measure shapes more quickly. However, the shape measurement device that employs a method such as the light-section method requires various types of conditions for measurements to be set, and thus the operations and processes thereof are complicated.

Having been achieved in light of the foregoing points, an object of the present teaching is to provide a shape measurement device, a structural object production system, a shape measurement method, a structural object production method, a shape measurement program, and a recording medium that enable the shape of an object to be measured to be measured more easily.

According to a first aspect of the present teaching, provided is a shape measurement device configured to measure a shape of an object to be measured. The device includes: a probe including a projection optical system configured to project, onto a surface of the object to be measured, a line-shaped pattern, or a spot pattern while scanning in at least a linear scanning range, and an image capturing device configured to detect an image of the pattern projected onto the object to be measured; a movement mechanism configured to rotate the object to be measured and the probe relative to each other so that the object to be measured rotates relative to the probe around a rotation axis and move at least one of the probe and the object to be measured relatively in a direction that intersects with a rotation direction of the relative rotation; a measurement region setting unit configured to set a measurement region of the object to be measured; and an actual measurement region setting unit configured to set an actual measurement region including an actual measurement start position and an actual measurement end position on the basis of the measurement region set by the measurement region setting unit. In such a shape measurement device, the actual measurement region setting unit sets whichever of the actual measurement start position and the actual measurement end position is closer to a rotation axis center to be closer to the rotation axis than the measurement region, or the actual measurement region setting unit sets whichever of the actual measurement start position and the actual measurement end position is positioned further outward in a radial direction to be further from the rotation axis than the measurement range.

According to a second aspect of the present teaching, provided is a shape measurement device configured to measure a shape of an object to be measured. The device includes: a probe including a projection optical system configured to project, onto a surface of the object to be measured, a line-shaped pattern, or a pattern while scanning in at least a linear scanning range, and an image capturing device configured to detect an image of the pattern projected onto the object to be measured; a movement mechanism configured to rotate the object to be measured and the probe relative to each other so that the object to be measured rotates relative to the probe around a rotation axis and moves at least one of the probe and the object to be measured relatively in a direction that intersects with a rotation direction of the relative rotation; and the control unit controls the movement mechanism in accordance with a relative positional relationship between the pattern or the linear scanning range when the pattern is projected onto the object to be measured and the rotation axis.

According to a third aspect of the present teaching, provided is a structural object production system. The system includes: a molding device configured to mold a structure on the basis of design information regarding a shape of the structure; the shape measurement device according to the first aspect or the second aspect of the present teaching that is configured to measure the shape of the structure molded by the molding device; and a control device configured to compare shape information expressing the shape of the structure measured by the shape measurement device with the design information.

According to a fourth aspect of the present teaching, provided is a shape measurement method for measuring a shape of an object to be measured by irradiating a surface of the object to be measured with a line-shaped pattern from a probe or projecting a spot pattern from the probe while scanning in at least a linear scanning range and causing the probe to detect an image of the pattern projected onto the object to be measured. The method includes the steps of: rotating the object to be measured and the probe relative to each other so that the object to be measured rotates relative to the probe around a rotation axis and moving at least one of the probe and the object to be measured relatively in a direction that intersects with a rotation direction of the relative rotation; setting a measurement region of the object to be measured; setting an actual measurement region including an actual measurement start position and an actual measurement end position on the basis of the measurement region; and setting whichever of the actual measurement start position and the actual measurement end position is closer to a rotation axis center to be closer to the rotation axis than the measurement region, or setting whichever of the actual measurement start position and the actual measurement end position is located further outward in the radial direction to be further from the rotation axis than the measurement range.

According to a fifth aspect of the present teaching, provided is a shape measurement method for measuring a shape of an object to be measured by irradiating a surface of the object to be measured with a line-shaped pattern from a probe or projecting a spot pattern from the probe while scanning in at least a linear scanning range and causing the probe to detect an image of the pattern projected onto the object to be measured. The method includes the steps of: rotating the object to be measured and the probe relative to each other so that the object to be measured rotates relative to the probe around a rotation axis and moving at least one of the probe and the object to be measured relatively in at least a direction that intersects with a rotation direction of the relative rotation; and controlling the movement mechanism in accordance with a relative positional relationship between the pattern or the linear scanning range when the pattern is projected onto the object to be measured and the rotation axis.

According to a sixth aspect of the present teaching, provided is a structural object production method. The method includes the steps of: molding a structure on the basis of design information regarding a shape of the structure; measuring the shape of the molded structure using the shape measurement method according to the fourth aspect of the fifth aspect of the present teaching; and comparing shape information expressing the measured shape of the structure with the design information.

According to a seventh aspect of the present teaching, provided is a shape measurement program for measuring a shape of an object to be measured by irradiating a surface of the object to be measured with a line-shaped pattern from a probe or projecting a spot pattern from the probe while scanning in at least a linear scanning range and causing the probe to detect an image of the pattern projected onto the object to be measured. The program causes a computer to execute the steps of: rotating the object to be measured and the probe relative to each other so that the object to be measured rotates relative to the probe around a rotation axis and moving at least one of the probe and the object to be measured relatively in a direction that intersects with a rotation direction of the relative rotation; setting a measurement region of the object to be measured;

setting an actual measurement region including an actual measurement start position and an actual measurement end position on the basis of the measurement region; and setting whichever of the actual measurement start position and the actual measurement end position is closer to a rotation axis center to be closer to the rotation axis than the measurement region, or setting whichever of the actual measurement start position and the actual measurement end position is located further outward in the radial direction to be further from the rotation axis than the measurement range.

a shape measurement program that measures a shape of an object to be measured by irradiating a surface of the object to be measured with a line-shaped pattern from a probe or projecting a spot pattern from the probe while scanning the surface of the object to be measured in at least a linear scanning range and causing the probe to detect an image of the pattern projected onto the object to be measured is provided, the program causing a computer to execute the steps of: rotating the object to be measured and the probe relative to each other so that the object to be measured rotates relative to the probe central to a rotation axis and moving one of the probe and the object to be measured relatively in at least a direction that intersects with a rotation direction of the stated relative rotation; setting a measurement region of the object to be measured; setting an actual measurement region including an actual measurement start position and an actual measurement end position on the basis of the measurement region; and setting whichever of the actual measurement start position and the actual measurement end position is closer to a rotation axis center to be closer to the rotation axis than the measurement region, and setting whichever of the actual measurement start position and the actual measurement end position is located further outward in the radial direction to be further from the rotation axis than the measurement range.

According to an eighth aspect of the present teaching, provided is a shape measurement program for measuring a shape of an object to be measured by irradiating a surface of the object to be measured with a line-shaped pattern from a probe or projecting a spot pattern from the probe while scanning in at least a linear scanning range and causing the probe to detect an image of the pattern projected onto the object to be measured. The program causes a computer to execute the steps of: rotating the object to be measured and the probe relative to each other so that the object to be measured rotates relative to the probe around a rotation axis and moving at least one of the probe and the object to be measured relatively in at least a direction that intersects with a rotation direction of the relative rotation; and controlling a movement mechanism in accordance with a relative positional relationship between the pattern or the linear scanning range when the pattern is projected onto the object to be measured and the rotation axis.

According to a ninth aspect of the present teaching, provided is a computer-readable recording medium having recorded therein the shape measurement program according to the seventh aspect of the eighth aspect of the present teaching.

Advantageous Effects of Embodiments

The present teaching enables a shape of an object to be measured to be measured more easily and in a shorter amount of time.

DESCRIPTION OF EMBODIMENTS

Hereinafter, the present teaching will be described in detail with reference to the drawings. Note that the present teaching is not intended to be limited by the embodiments for carrying out the teaching (hereinafter, called "embodiment(s)") described below. In addition, the constituent elements of the following embodiments are assumed to include elements that fall within a so-called equivalent scope, that is, that are substantially the same and are easily conceived of by one skilled in the art. Furthermore, the constituent elements disclosed in the following embodiments can be combined as appropriate.

Figure 10:
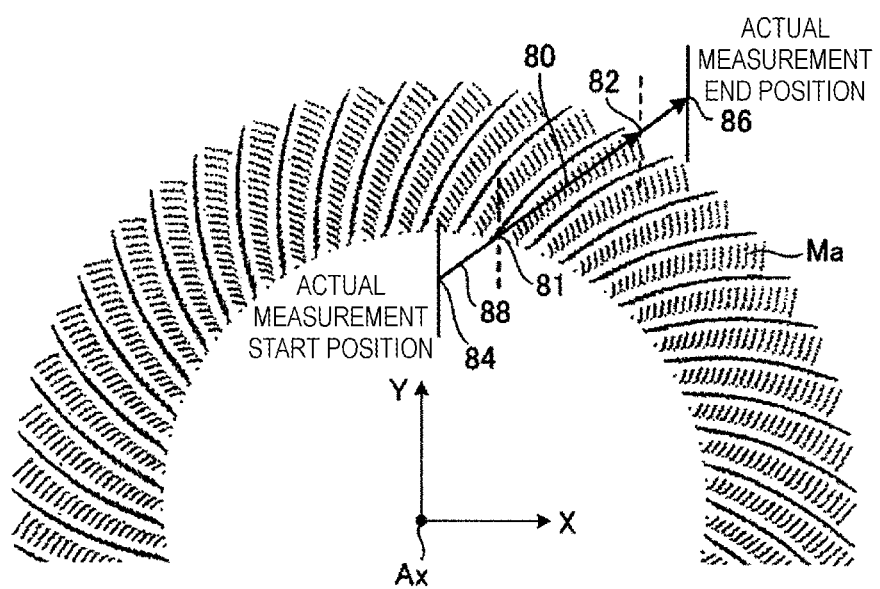
FIG. 10 is a diagram illustrating the measurement operation of the shape measurement device according to the first embodiment.

In the following descriptions, an XYZ orthogonal coordinate system is set, and positional relationships between elements will be described with reference to this XYZ orthogonal coordinate system. A Z-axis direction is set to, for example, the vertical direction, and an X-axis direction and a Y-axis direction are set to, for example, mutually-orthogonal directions that are each parallel to the horizontal direction. Furthermore, rotation (tilt) directions relative to the X-axis, the Y-axis, and the Z-axis are defined as θX, θY, and θZ directions, respectively. Note that, in the present embodiment, a radial direction is a direction that transects a rotation direction in which an object to be measured and an optical probe that projects a pattern onto the object to be measured rotate relative to each other. In other words, the radial direction is a direction that transects a locus rotating central to a rotation axis Ax in a plane that intersects with the rotation axis Ax (for example, a plane orthogonal to the rotation axis Ax, as indicated in FIG. 10, a conical plane having an apex on the rotation axis Ax, or the like).

First Embodiment

Figure 1:
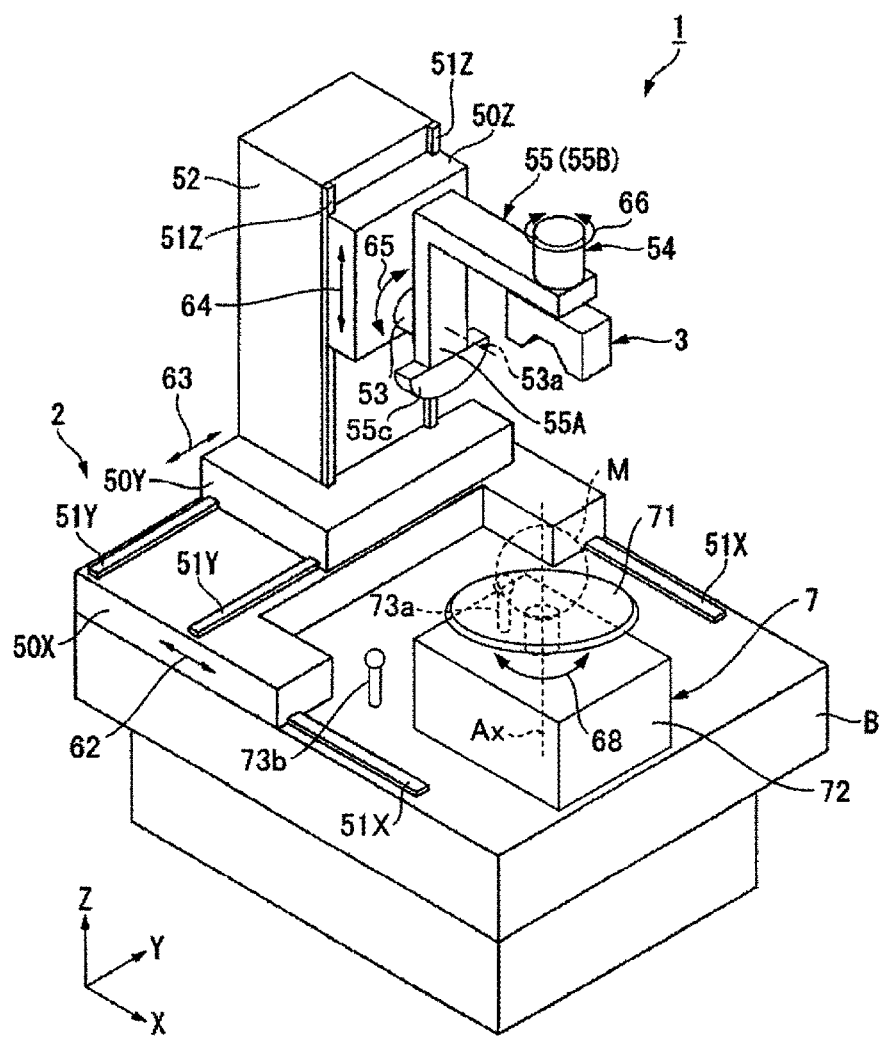
FIG. 1 is a perspective view of a shape measurement device according to a first embodiment.
Figure 2:
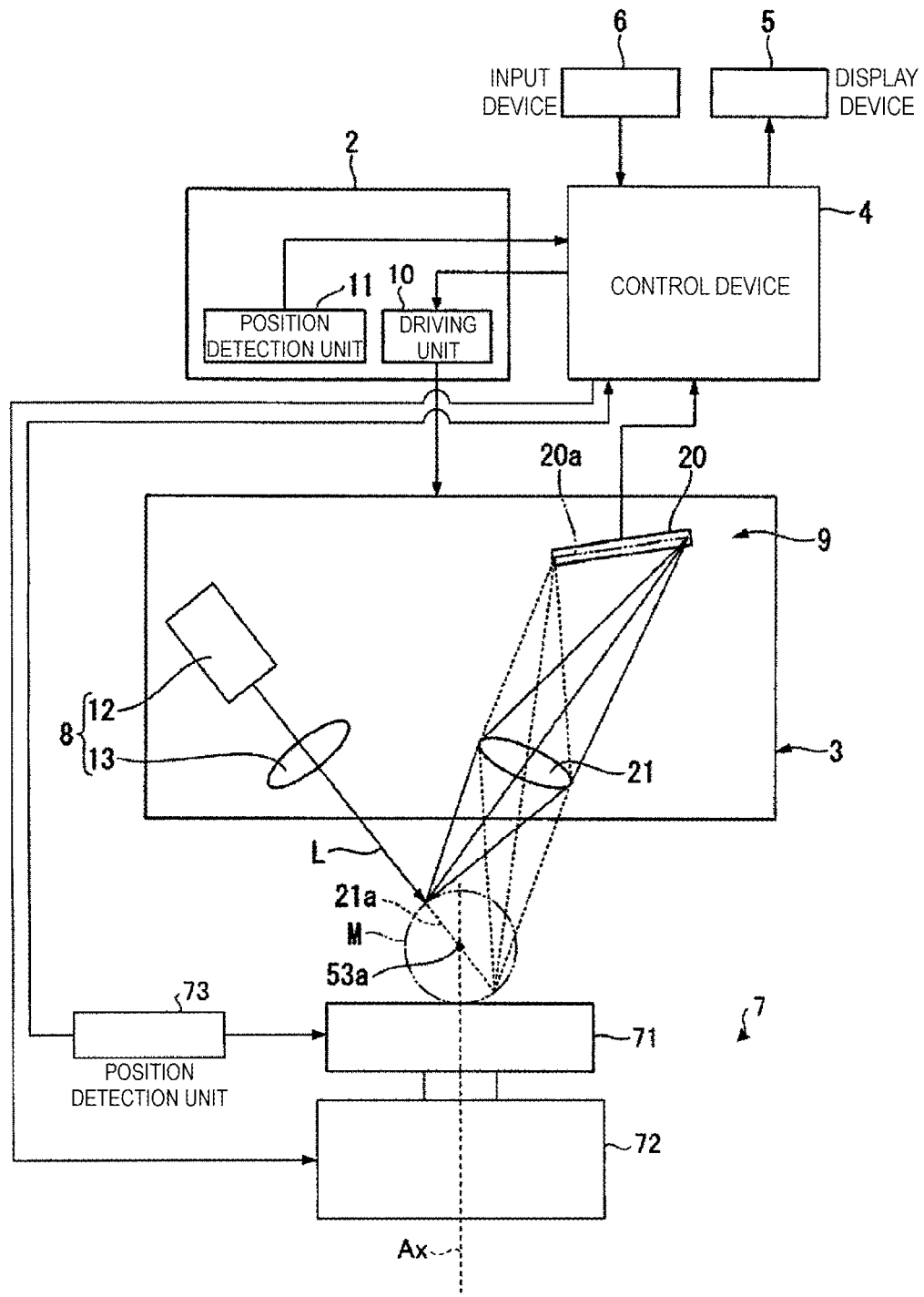
FIG. 2 is a schematic diagram of the configuration of the shape measurement device according to the first embodiment.
Figure 3:
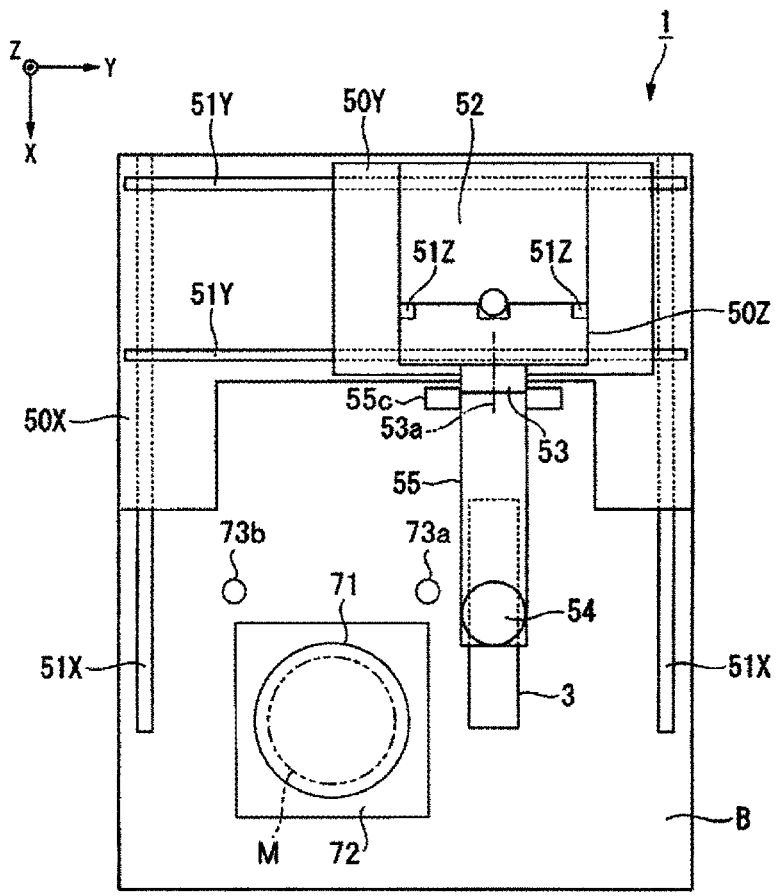
FIG. 3 is a top view of the shape measurement device according to the first embodiment.
Figure 4:
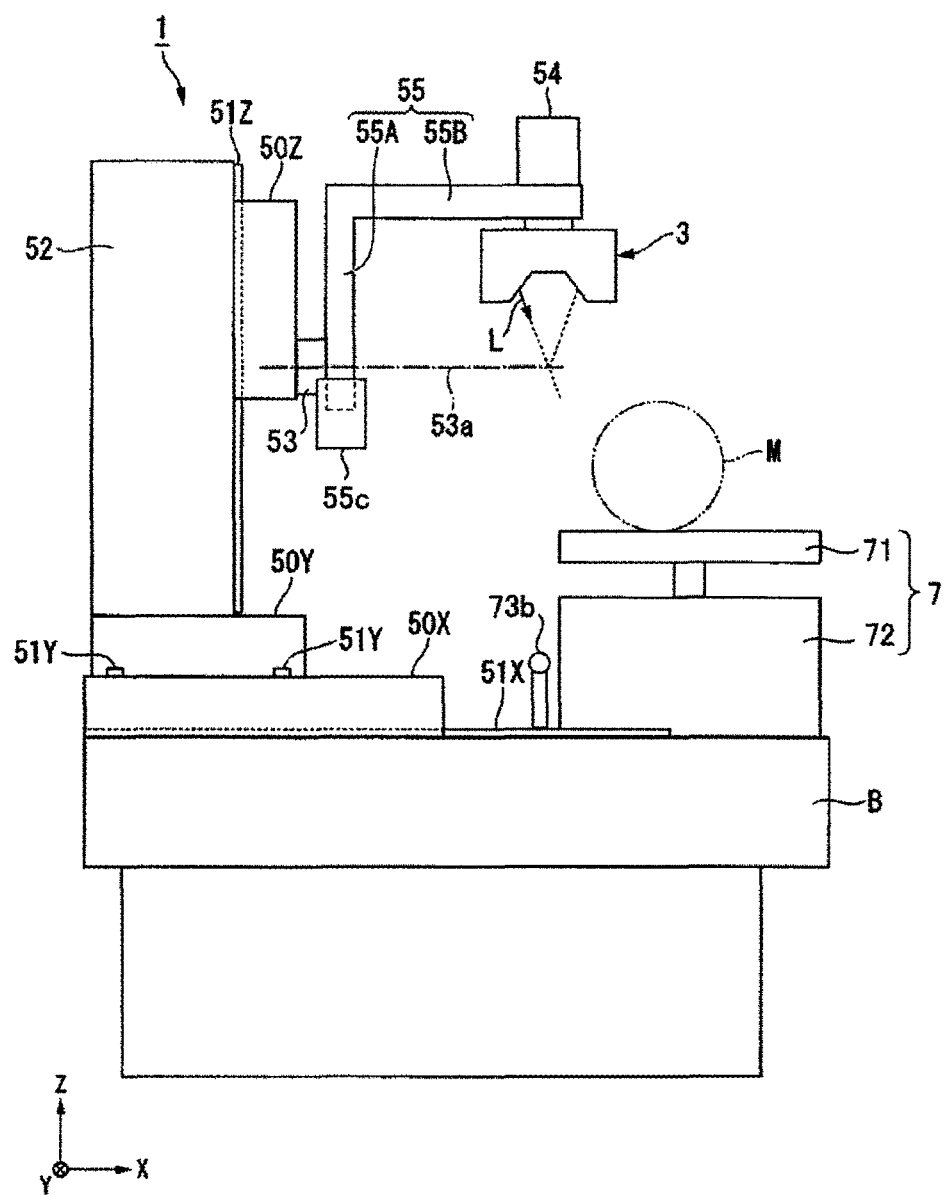
FIG. 4 is a side view of the shape measurement device according to the first embodiment.
Figure 5:
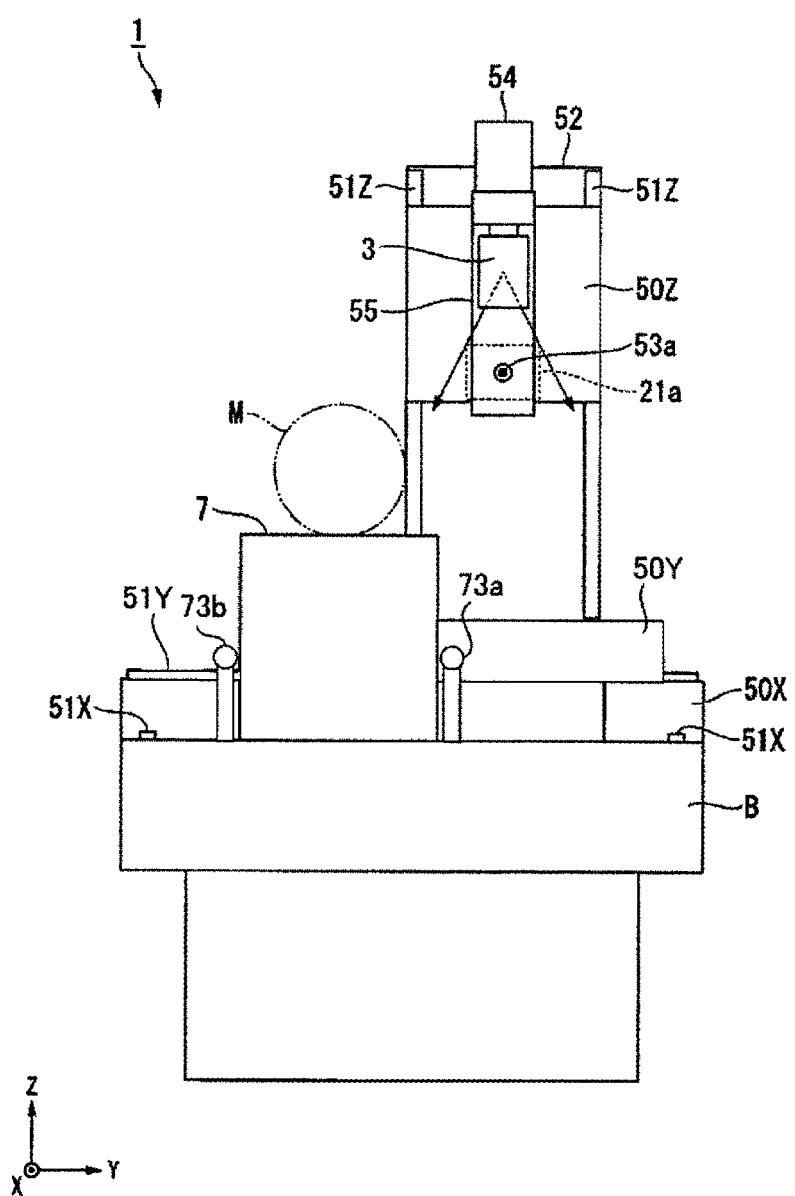
FIG. 5 is a front view of the shape measurement device according to the first embodiment.
Figure 7:
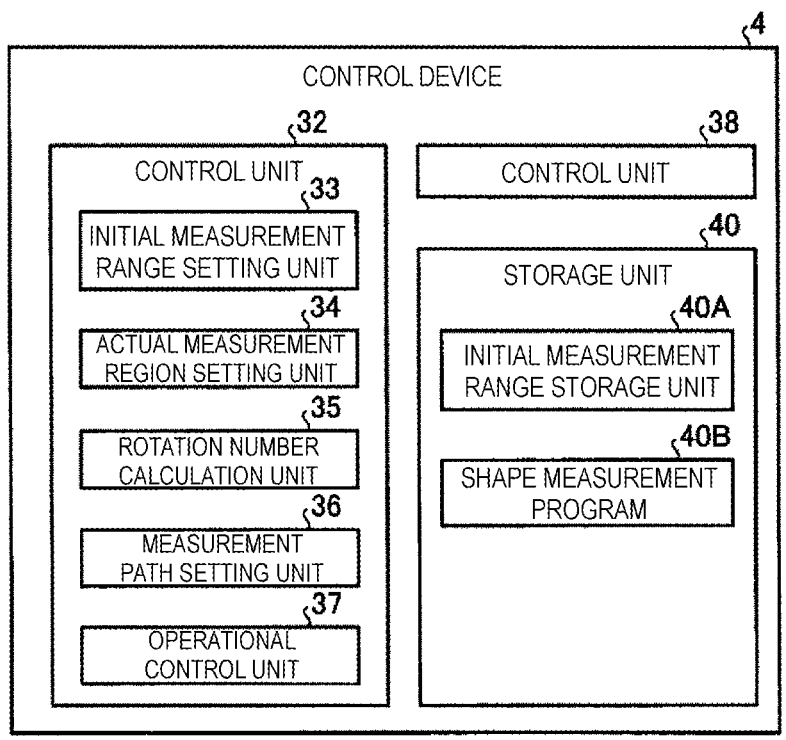
FIG. 7 is a block diagram illustrating the overall configuration of a control device of the shape measurement device according to the first embodiment.

FIG. 1 is a diagram illustrating the external appearance of a shape measurement device 1 according to a first embodiment. FIG. 2 is a schematic diagram illustrating the overall configuration of the shape measurement device 1 according to the first embodiment. FIG. 3 is a plan view illustrating the shape measurement device 1. FIG. 4 is a left side view illustrating the shape measurement device 1. FIG. 5 is a front view illustrating the shape measurement device 1. FIG. 7 is a block diagram illustrating the overall configuration of a control device of the shape measurement device according to the first embodiment.

The shape measurement device 1 is configured to measure a shape of a measurement target object (an object to be measured) M in three dimensions using the light-section method, for example. The shape measurement device 1 includes a probe movement device 2, an optical probe 3, a control device 4, a display device 5, an input device 6, and a holding/rotating device 7. The shape measurement device 1 is configured to cause the optical probe 3 to capture an image of the object to be measured M held on the holding/rotating device 7 that is provided on a base B. Note that, in the present embodiment, the probe movement device 2 and the holding/rotating device 7 serve as a movement mechanism that move the probe and the object to be measured relative to each other.

The probe movement device 2 is a device for moving the optical probe 3 relative to the object to be measured M so as to set a position of the optical probe 3 in three-dimensional space so that an image capturing range (field of view) of the optical probe 3 reaches a measurement target region of the object to be measured M and position a projection direction of a pattern, mentioned later, projected from the optical probe 3 and an orientation of the pattern projected on the measurement target region of the object to be measured M, and so that the image capturing range of the optical probe 3 is scanned upon the object to be measured M. As illustrated in FIG. 2, this probe movement device 2 includes a driving unit 10 and a position detection unit 11. The driving unit 10 includes an X moving unit 50X, a Y moving unit 50Y, a Z moving unit 50Z, a first rotating unit 53, and a second rotating unit 54.

The X moving unit 50X is provided so as to be freely moving in a direction of an arrow 62 along guides 51X that are provided on both side edges of the base B in the Y-axis direction, extending in the X-axis direction, or in other words, to be freely moving in the X-axis direction. The Y moving unit 50Y is provided so as to be freely moving in a direction of an arrow 63 along guides 51Y that are provided, spaced apart from each other in the X-axis direction, on the X moving unit 50X, extending in the Y-axis direction, or in other words, to be freely moving in the Y-axis direction. A holding member 52 that extends in the Z-axis direction is provided on the Y moving unit 50Y. The Z moving unit 50Z is provided so as to be freely moving in a direction of an arrow 64 along guides 51Z that are provided on both side edges of the holding member 52 in the Y-axis direction, extending in the Z-axis direction, or in other words, to be freely moving in the Z-axis direction. The X moving unit 50X, the Y moving unit 50Y, and the Z moving unit 50Z constitute, along with the first rotating unit 53 and the second rotating unit 54, a movement mechanism that enables the optical probe 3 to move in the X-axis direction, the Y-axis direction, and the Z-axis direction.

The first rotating unit 53 is configured to change the attitude of the optical probe 3 by rotating the optical probe 3 held by a holding member (holding unit) 55, which will be described later, around a rotation axis line (rotation axis) 53a parallel to the X-axis, or in other words, in the direction of an arrow 65, thereby allowing the projection direction of the pattern projected from the optical probe 3 toward the object to be measured M to be changed in particular. The first rotating unit 53 includes a rotational drive source such as a motor. A rotation angle of the rotational drive source (that is, a rotation angle of the optical probe 3 central to the rotation axis line 53a) is read by a first angle reading unit (not illustrated).

The second rotating unit 54 is configured to change the attitude of the optical probe 3 by rotating the optical probe 3 held by the holding member 55 around an axis line parallel to a direction in which a first holding portion 55A, which will be described later, extends, or in other words, in the direction of an arrow 66, thereby allowing the orientation of the pattern projected from the optical probe 3 to be changed in particular. The second rotating unit 54 includes a second rotational drive source such as a motor. A rotation angle of the second rotational drive source (that is, a rotation angle of the optical probe 3 central to the axis line that is parallel to the direction in which the first holding portion 55A extends) is read by a second angle reading unit (not illustrated). Although the second rotating unit 54 according to the present embodiment is rotated by the second rotational drive source, the second rotating unit 54 may be rotated only manually without any drive source. Alternatively, the second rotating unit 54 may be configured so that a drive source and a manual operation are selectively set.

Figure 6A:
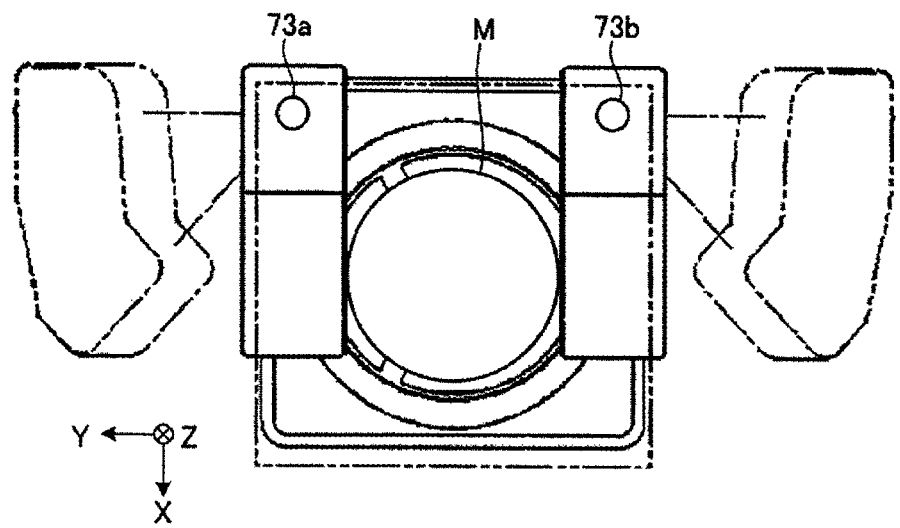
FIG. 6A is a top view of a range in which a first rotating unit can move an optical probe.
Figure 6B:
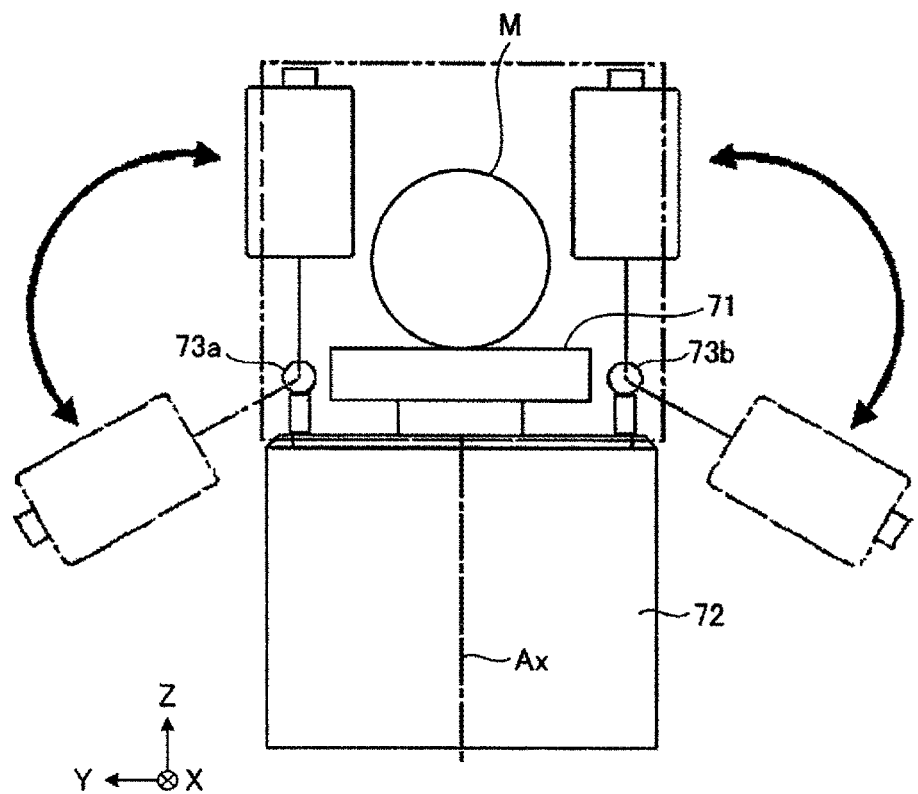
FIG. 6B is a rear view of the range in which the first rotating unit can move the optical probe.

The angle by which the first rotating unit 53 rotates the optical probe 3 around the rotation axis line 53a is set to 300°, for example. FIG. 6A is a top view of a range in which the first rotating unit 53 can move the optical probe 3. FIG. 6B is a rear view of a range in which the first rotating unit 53 can move the optical probe. As illustrated in FIGS. 6A and 6B, enabling the optical probe 3 to rotate by not less than 180° allows not only the front surface side of the object to be measured M but also the rear surface side thereof to be measured. The shape measurement device 1 has two reference spheres 73a and 73b disposed on the base B thereof. The two reference spheres 73a and 73b are disposed on the left and right sides, respectively (both sides in the Y-axis direction) of the holding/rotating unit 7. The two reference spheres 73a and 73b are each set to a position that, when the Y moving unit 50Y is moved to the maximum limit in the +Y direction and the −Y direction, overlaps with the rotation axis line 53a as viewed from the Z-axis direction. The rotation axis line 53a can be set to pass through the reference sphere 73a or the reference sphere 73b by adjusting the X moving unit 50X, the Y moving unit 50Y, and the Z moving unit 50Z, as illustrated in FIGS. 6A and 6B. Accordingly, the shape of one of the reference spheres can be measured regardless of the rotational driving amount of the first rotating unit 53.

Incidentally, in the case where there is mechanical looseness between the optical probe 3 and the holding member 55 that holds the optical probe 3, the positions of the reference spheres measured by the shape measurement device 1 will differ depending on the rotation amount of the first rotating unit 53. To correct this amount, the shape measurement device measures a position of the reference sphere 73a or the reference sphere 73b when the optical probe 3 is at the attitude indicated by the solid line and when the optical probe 3 is at the attitude indicated by the long dashed short dashed line. A difference in measurement coordinates found at that time is stored as an error amount. Correcting the attitude and position information of the optical probe 3 on the basis of this error amount makes it possible to obtain correct measurement results even when the optical probe 3 is at any attitude.

The X moving unit 50X, the Y moving unit 50Y, the Z moving unit 50Z, the first rotating unit 53, and the second rotating unit 54 are driven according to the control made by the control device 4 on the basis of a detection result from the position detection unit 11 that is constituted by a device such as an encoder.

The optical probe 3 includes a projecting device 8 and an image capturing device 9, and the optical probe 3 is supported by the holding member 55. The holding member 55 is formed having an approximate L shape in which the first holding portion (first part, first member) 55A that extends in a direction orthogonal to the rotation axis line 53a and that is supported by the first rotating unit 53 is perpendicular to a second holding portion (second part, second member) 55B that is provided on an end portion of the first holding portion 55A that is remote from the object to be measured M and that extends parallel to the rotation axis line 53a, and the optical probe 3 is supported on an end portion of the second holding portion 55B that is located on a +X side of the second holding portion 55B. A position of the rotation axis line 53a of the first rotating unit 53 is set to be closer to the object to be measured M than the optical probe 3. Meanwhile, a counterbalance 55c is provided on another end portion of the first holding portion 55A that is closer to the object to be measured M. Accordingly, when no driving force is applied to the first rotating unit 53, the first holding portion 55A is at an attitude so as to extend in the Z-axis direction.

As illustrated in FIGS. 1 to 5, the holding/rotating device 7 includes a table 71 that holds the object to be measured M, a rotational driving unit 72 that rotates the table 71 in the θZ direction, or in other words, in the direction of an arrow 68, and a position detection unit 73 that detects a position of the table 71 in the rotation direction thereof. The position detection unit 73 is an encoder that detects the rotation of a rotating shaft of the table 71 or the rotational driving unit 72. The holding/rotating device 7 causes the rotational driving unit 72 to rotate the table 71 on the basis of a result of the detection performed by the position detection unit 73. The holding/rotating device 7 rotates the table 71 to cause the object to be measured M to be rotated in the direction of the arrow 68 central to a rotation axis center AX.

Incidentally, the projecting device 8 of the optical probe 3 is a device that projects light onto part of the object to be measured M held on the holding/rotating device 7 under control of the control device 4, and that includes a light source 12 and a projection optical system 13. The light source 12 according to the present embodiment includes a laser diode, for example. Note that aside from a laser diode, the light source 12 may include a solid-state light source such as a light-emitting diode (LED).

The projection optical system 13 adjusts a spatial optical intensity distribution of the light emitted from the light source 12. The projection optical system 13 according to the present embodiment includes a cylindrical lens, for example. The projection optical system 13 may be a single optical element, or may include a plurality of optical elements. The light emitted from the light source 12 has its spot widened in a direction in which the cylindrical lens has positive power, and is emitted from the projecting device 8 toward the object to be measured M along a first direction. As illustrated in FIG. 2, in the case where light is emitted from the projecting device 8 and projected onto the object to be measured M, when the light is projected onto the object to be measured M having a plane orthogonal to the emitting direction of the projecting device 8, a line-shaped pattern parallel to the rotation axis line 53a, which takes a direction parallel to the rotation axis line 53a as its longer direction, is formed. This line-shaped pattern has a predetermined length in the longer direction on the object to be measured M.

Note that the longer direction of this line-shaped pattern (the orientation of the pattern) can be changed by the above-described second rotating unit 54. An effective measurement can be carried out by changing the longer direction of the line-shaped pattern in accordance with the direction in which the plane of the object to be measured spreads.

Note that the projection optical system 13 may include a diffractive optical element such as a CGH (Computer Generated Hologram), and may adjust the spatial optical intensity distribution of an illumination light flux L emitted from the light source 12 using the diffractive optical element. Meanwhile, in the present embodiment, projected light whose spatial optical intensity distribution has been adjusted is sometimes referred to as pattern light. The illumination light flux L is an example of the pattern light. Incidentally, the expression "the orientation of the pattern" in the present specification refers to the direction of the longer direction of the line-shaped pattern.

The image capturing device 9 includes an imaging element 20 and an image-forming optical system 21. The illumination light flux L projected onto the object to be measured M by the projecting device 8 is reflected and scattered by a surface of the object to be measured M, and at least some of the reflected and scattered light enters the image-forming optical system 21. The image-forming optical system 21 forms, on the imaging element 20, an image of the line-shaped pattern projected onto the surface of the object to be measured M by the projecting device 8. The imaging element 20 outputs an image signal in accordance with the image formed by the image-forming optical system 21.

The image-forming optical system 21 is provided such that an object plane 21a and a light-receiving surface 20a (image plane) of the imaging element 20 are in a conjugate relationship on a plane including the emission direction of the illumination light flux L serving as line light from the projecting device 8 and a longer direction of the spot shape of the illumination light flux L. Note that the plane including the emission direction of the illumination light flux L from the projecting device 8 and the longer direction of the spot shape of the illumination light flux L is substantially parallel to a propagation direction of the illumination light flux L. Forming a plane conjugate with the light-receiving surface 20a of the imaging element 20 along the propagation direction of the illumination light flux L, an in-focus image can be obtained regardless of the position of the surface of the object to be measured M.

Incidentally, the aforementioned rotation axis line 53a of the first rotating unit 53 is located toward the object to be measured M relative to the optical probe 3, as illustrated in FIG. 2. To be more specific, the rotation axis line 53a is located at a position, on the object plane 21a of the image-forming optical system 21, passing through a center area of the object plane 21a in the projection direction (optical axis direction, a predetermined direction) of the illumination light flux L. Accordingly, as long as the position of the object to be measured M on which the line-shaped pattern is projected is on a line extending from the rotation axis line 53a, the illumination light flux L can be projected in any desired direction, regardless of what attitude the first holding portion 55A has been put in by the first rotating unit 53.

In the case where the surface of the object to be measured M is a mirror surface and light reflected many times over by the surface of the object to be measured M enters the image-forming optical system 21, images that affect the measurement result are formed on the light-receiving surface 20a of the imaging element 20 in addition to the image that is formed when the illumination light flux L is projected. An error will arise in the measurement result if such images are also detected by the image capturing device 9 of the optical probe 3. However, the shape measuring apparatus 1 can cause the first rotation unit 53 to change the incidence direction of the illumination light flux L relative to the object to be measured M. This eliminate such images that affect the measurement result or sufficiently reduces the quantity of light that forms the images, thereby reducing the influence on the measurement result.

The control device 4 controls each of the units of the shape measurement device 1 and carries out calculation processing on the basis of the image capturing result from the optical probe 3 and the position information of the probe movement device 2 and the holding/rotating device 7 to acquire shape information of the object to be measured M. In the present embodiment, the shape information includes information expressing at least one of a shape, a dimension, an unevenness distribution, a surface roughness, and a position (coordinates) of a point on a measurement target surface, for at least part of the object to be measured M, which is the measurement target. The display device 5 and the input device 6 are connected to the control device 4. As illustrated in FIG. 7, the control device 4 includes a control unit 32, a computation unit 38, and a storage unit 40.

The control unit 32 generates a program for measuring the object to be measured M and controls the shape measurement operation for the object to be measured M using the various units on the basis of the generated program. The control unit 32 includes an initial measurement range setting unit 33, an actual measurement region setting unit 34, a rotation number calculation unit 35, a measurement path setting unit 36, and an operation control unit 37.

The initial measurement range setting unit 33 sets an initial measurement range that serves as a reference for determining the shape measurement program for the object to be measured M. The initial measurement range includes at least a position of an initial inner-side end portion near the rotation axis around which the optical probe 3 and the object to be measured M are rotated relative to each other, and a position of an initial outer-side end portion located at the position on an outer circumference of the object to be measured in a radial direction relative to the rotation produced by the movement mechanism. The initial measurement range setting unit 33 analyzes inputted shape data of the object to be measured M to set the initial measurement range. Meanwhile, in the case where the object to be measured M has a shape having a repeated shape in a circumferential direction and having a non-planar shape extending in a different direction from the circumferential direction, such as with a gear, a turbine blade, or the like, the initial measurement range setting unit 33 obtains information regarding the initial measurement range from a path connecting an initial measurement start position and an initial measurement end position obtained from an initial shape measurement program, each time a single instance of the repeated shape is measured. The initial measurement range includes a range a user wishes to measure.

The actual measurement region setting unit 34 sets an actual measurement region, which is a region that is actually measured, on the basis of conditions set by the initial measurement range setting unit 33. The actual measurement region is a range including at least the entirety of a region to be measured of the object to be measured M. The actual measurement region is at least a region where the line-shaped pattern is projected onto the object to be measured. Whether or not position information of the actual measurement region where the line-shaped pattern is projected is calculated by the shape measurement device is not a requisite factor.

The rotation number calculation unit 35 calculates the number of times the optical probe 3 and the object to be measured M are rotated relative to each other during measurement, or in other words, in the present embodiment, the number of times the object to be measured M is rotated by the holding/rotating device 7 during measurement, on the basis of the region to be actually measured, as well as the orientation of the line-shaped pattern projected onto the object to be measured M, the length of the line-shaped pattern, and so on. Here, the rotation number calculation unit 35 calculates a minimum value of the number of rotations necessary to measure the region to be actually measured, as well as the actual number of rotations. Here, the actual number of rotations is a value that is greater than the minimum value of the number of rotations necessary to measure the region to be actually measured. Meanwhile, it is possible that the actual number of rotations be an integer. Through this, the position where the measurement is started and the position where the measurement is ended in the rotation direction can be set to the same position.

The measurement path setting unit 36 sets a measurement path on the basis of the orientation of the line-shaped pattern projected onto the object to be measured M, the length of the line-shaped pattern, and the number of rotations, and determines the shape measurement program on the basis of the measurement path. The shape measurement program specifies a time schedule of a direction and velocity of the movement of the optical probe 3 by the probe movement device 2 and a rotation angular velocity of the holding/rotating device 7 necessary to measure the measurement target range of the object to be measured M. This time schedule is set so as to correspond to an image capturing interval of the imaging element 20 of the optical probe 3 and the maximum acquisition interval for the measurement points desired by a user. In addition, the movement direction and movement distance of the optical probe 3 during a single rotation of the object to be measured M by the holding/rotating device 7 can be calculated, and reflected on the time schedule. Note that in the present teaching, the movement direction and movement distance of the optical probe 3 during a single rotation of the object to be measured M by the holding/rotating device 7 may be calculated independent from the number of rotations calculated by the rotation number calculation unit 35.

Incidentally, the measurement path is a locus of movement of the line-shaped pattern that moves along the object to be measured M when the measurement target range of the object to be measured M is measured. The measurement path setting unit 36 determines operational control of the movement mechanism from an actual measurement start position to an actual measurement end position required to project the line-shaped pattern onto the measurement range of the object to be measured M or measure the measurement range, on the basis of the measurement path and the projection direction of the illumination light flux L at each of positions along the measurement path.

The operation control unit 37 controls the operations of the respective elements of the shape measurement device 1, including the probe movement device 2, the optical probe 3, and the holding/rotating device 7. The operation control unit 37 carries out operational control of the probe movement device 2, the optical probe 3, and the holding/rotating device 7 on the basis of operational control information created by the control unit 32. Note that the control unit 32 calculates the number of rotations required to be made by the movement mechanism in order to measure the actual measurement region of the object to be measured M and controls the operation of the movement mechanism 2 through the operational control of the movement mechanism 2 set on the basis of the number of rotations. For example, the control unit 32 creates the operational control information on the basis of measurement path information set by the measurement path setting unit 36 and transmits that information to an operational control unit, so that the operational control of the probe movement device 2, the optical probe 3, and the holding/rotating device 7 during shape measurement is carried out. In addition, the control unit 32 controls the start and stop of acquiring an image group to be used in a series of measurements taken by the optical probe 3, and the light emission by the light source on the basis of position information acquired from the probe movement device 2, the holding/rotating device 7, and the like.

The computation unit 38 calculates a position on the object to be measured M where the pattern is projected on the basis of position information of the probe movement device 2 and the holding/rotating device 7 from the position detection unit 11 acquired at a timing that the image capturing device 9 captures an image and an image capture signal related to an image of a pattern image acquired by the image capturing device 9, and outputs shape data of the object to be measured M. Note that in the shape measurement device 1, the image capturing timing of the image capturing device 9 is set to a fixed interval, and the movement velocities of the probe movement device 2 and the holding/rotating device 7 are controlled on the basis of measurement point interval information inputted from the input device 6.

The storage unit 40 is a storage device, such as a hard disk or a memory, that stores various types of programs, and data. The storage unit 40 includes an initial measurement range storage unit 40A and a shape measurement program 40B. Note that in addition to these programs and data, the storage unit 40 also stores various types of programs and data used to control the operation of the shape measurement device 1. The initial measurement range storage unit 40A stores the initial measurement range set by the initial measurement range setting unit 33. The shape measurement program 40B stores a program that causes processes of the various elements of the control device 4 to be executed. In other words, the control device 4 executes a program stored in the shape measurement program 40B to achieve the operations of the aforementioned elements. The shape measurement program 40B includes both a program for measuring the object to be measured M, generated by the aforementioned control unit 32, and a program for the control unit 32 to generate that program. The shape measurement program 40B may be stored in the storage unit 40 in advance, but is not limited thereto. The shape measurement program 40B may be read from a storage medium in which the shape measurement program 40B is stored and then stored in the storage unit 40, or the shape measurement program 40B may be acquired from the exterior through communications.

The control device 4 according to the present embodiment includes the initial measurement range setting unit 33, but is not limited thereto. The control device 4 need only include the initial measurement range storage unit 40A, and need not include the initial measurement range setting unit 33.

The control device 4 controls the driving unit 10 of the probe movement device 2 and the rotational driving unit 72 of the holding/rotating device 7 so that the relative positions of the optical probe 3 and the object to be measured M satisfies a predetermined positional relationship. In addition, the control device 4 controls the quantity of light of the light source, the exposure of the imaging element 20, and the like so that the brightness of the pattern projected from the optical probe 3 so as to achieve an image having a brightness optimal for the image capturing device 9, so as to capture an image of the line-shaped pattern projected onto the object to be measured M at the optimal quantity of light. The control device 4 acquires position information of the optical probe 3 from the position detection unit 11 of the probe movement device 2, and acquires data corresponding to the captured image of the measurement region (captured image data) from the optical probe 3. Then, the control device 4 associates a position on the surface of the object to be measured M acquired from the captured image data that is based on the position of the optical probe 3 with the position of the optical probe 3, the projection direction of the line light and an image capturing direction of the image capturing device and calculates and acquires the shape information on a three-dimensional shape of the measurement target.

The display device 5 is constituted by a liquid-crystal display device, an organic electroluminescence display device, or the like, for example. The display device 5 displays measurement information on the measurement performed by the shape measurement device 1. The measurement information includes information such as configuration information indicating configurations regarding the measurement, progress information indicating progress of the measurement, and the shape information expressing a result of the measurement, for example. The display device 5 according to the present embodiment is supplied with image data expressing the measurement information from the control device 4 and displays an image expressing the measurement information on the basis of this image data.

The input device 6 is constituted by various types of input devices such as a keyboard, a mouse, a joystick, a trackball, and a touchpad. The input device 6 receives the input of various types of information for the control device 4. The various types of information include instruction (command) information instructing the shape measurement device 1 to begin measurement, configuration information on the measurement performed by the shape measurement device 1, operation information for manually operating at least part of the shape measurement device 1, and the like, for example. The aforementioned initial measurement region may also be inputted using this input device 6.

In the shape measurement device 1 according to the present embodiment, the control device 4 includes the control unit 32, the computation unit 38, and the storage unit 40, and the display device 5 and the input device 6 are connected to the control device 4. In the shape measurement device 1, the control device 4, the display device 5, and input device 6 may, for example, be a computer connected to the shape measurement device 1, or a host computer located in a structure where the shape measurement device 1 is installed. Further alternatively, the host computer may be at a position distanced from the shape measurement device 1 rather than being limited to a structure in which the shape measurement device 1 is installed, and may be connected by a computer to the shape measurement device 1 through communications such as the Internet. In addition, in the shape measurement device 1, the control device 4, the display device 5, and the input device 6 may be held at different locations. For example, the shape measurement device 1 may be supported within the optical probe 3, for example, outside of a computer that includes the input device 6 and the display device 5. In this case, the information acquired by the shape measurement device 1 is transferred to the computer through communications.

Figure 8:
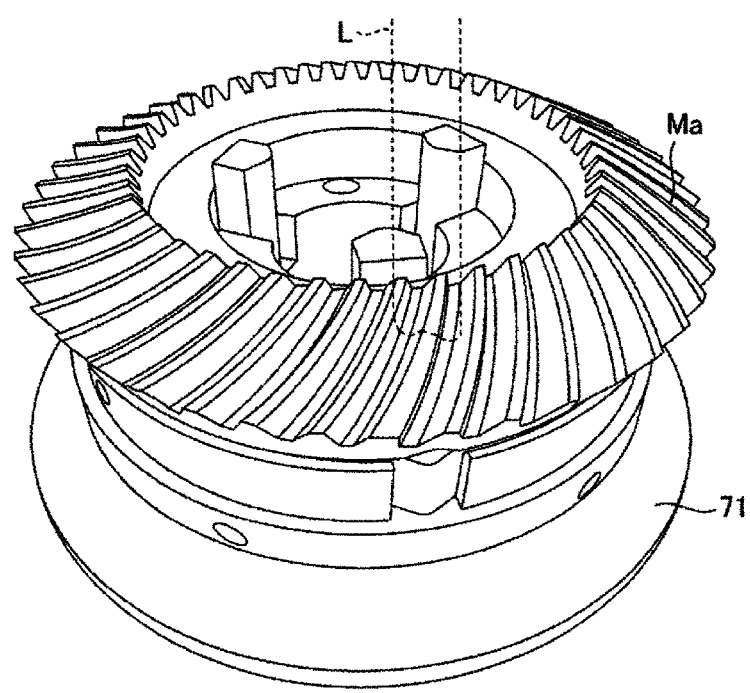
FIG. 8 is a diagram illustrating a measurement operation of the shape measurement device according to the first embodiment.
Figure 9:
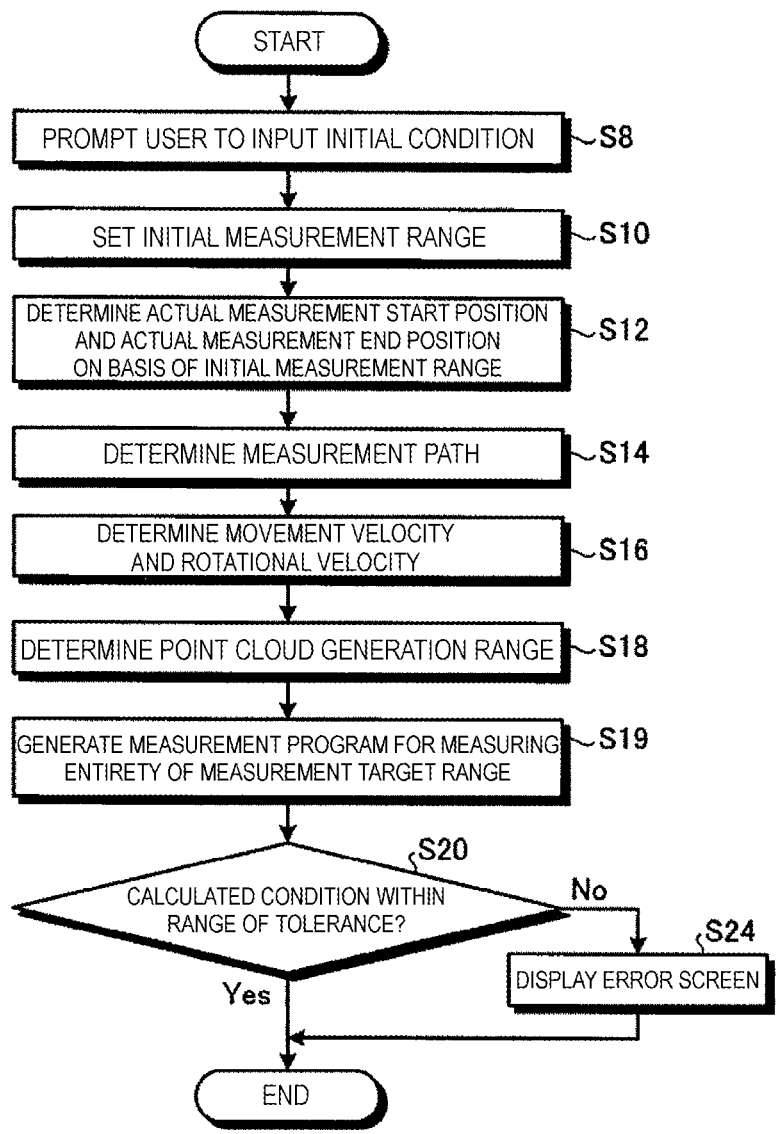
FIG. 9 is a flowchart illustrating an example of the measurement operation of the shape measurement device according to the first embodiment.
Figure 11:
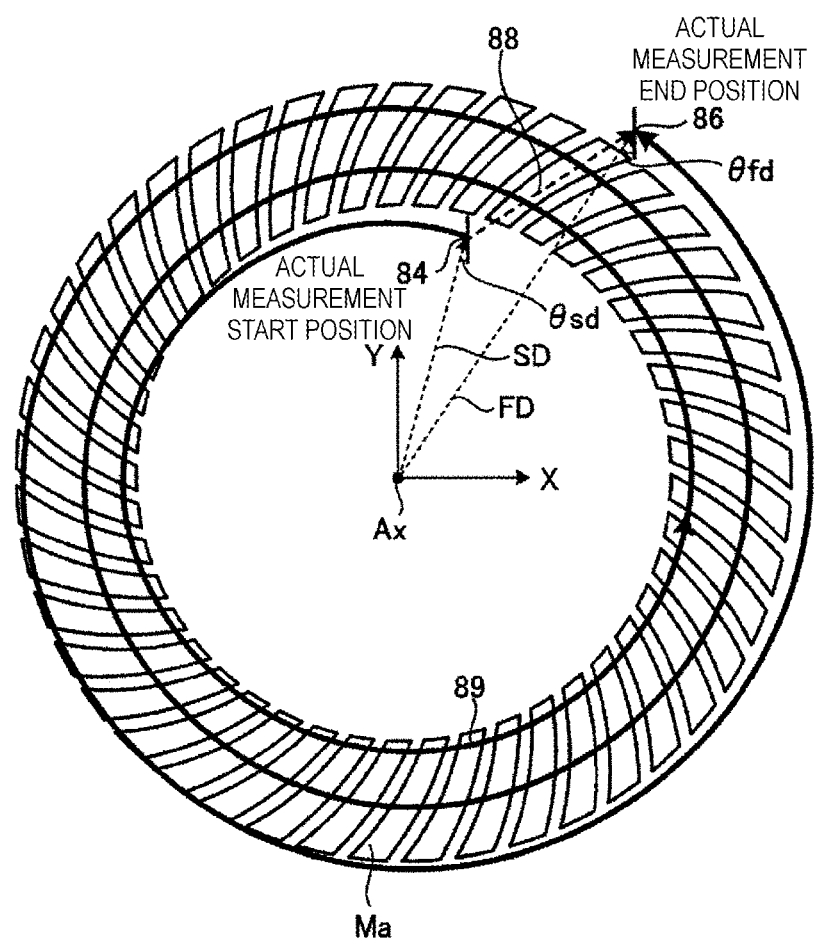
FIG. 11 is a diagram illustrating the measurement operation of the shape measurement device according to the first embodiment.
Figure 12:
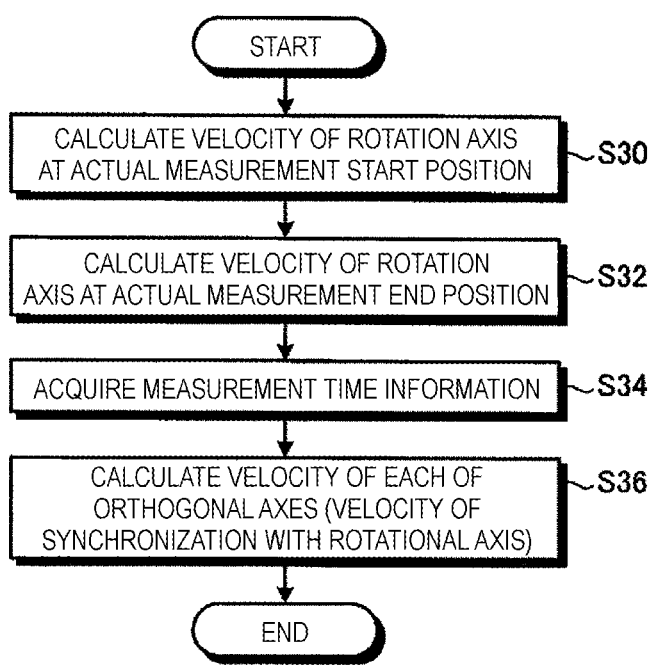
FIG. 12 is a flowchart illustrating the measurement operation of the shape measurement device according to the first embodiment.
Figure 13:
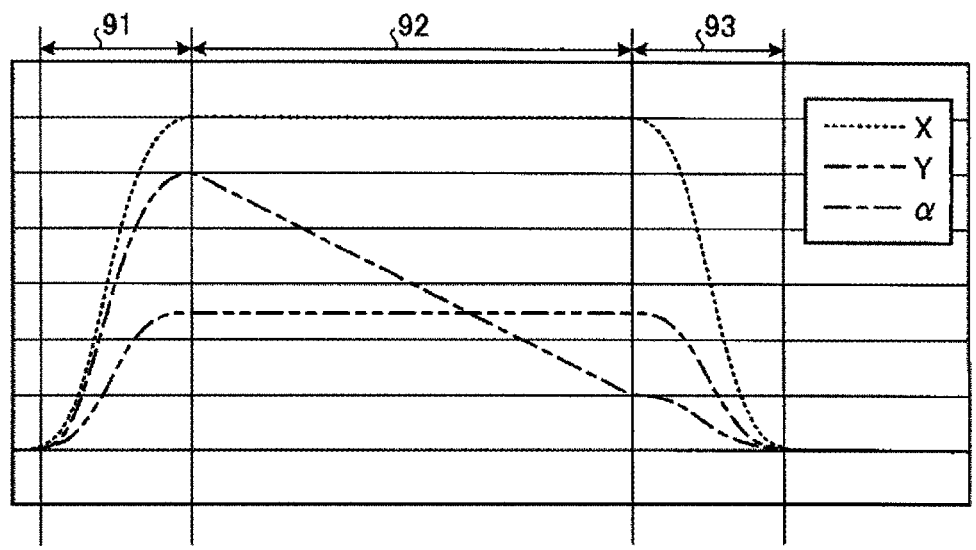
FIG. 13 is a graph illustrating the measurement operation of the shape measurement device according to the first embodiment.
Figure 14:
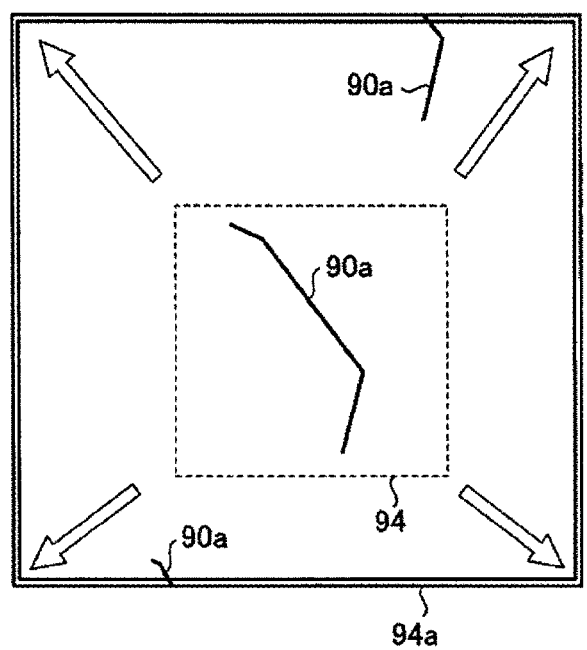
FIG. 14 is a diagram illustrating the measurement operation of the shape measurement device according to the first embodiment.
Figure 15A:
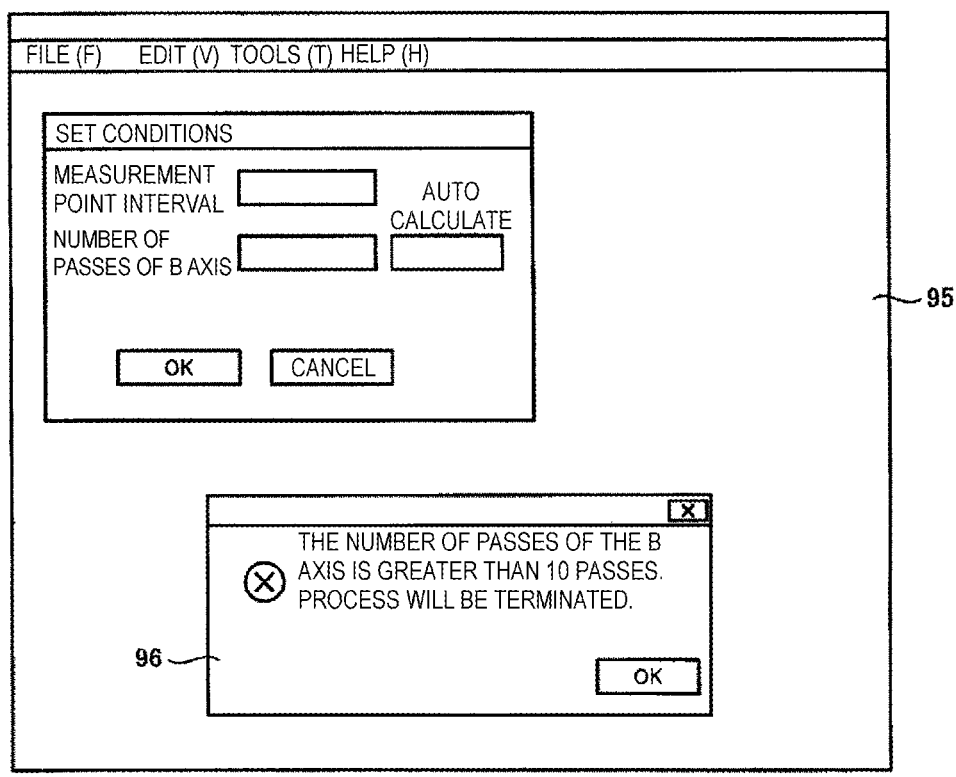
FIG. 15A is a diagram illustrating the measurement operation of the shape measurement device according to the first embodiment.
Figure 15B:
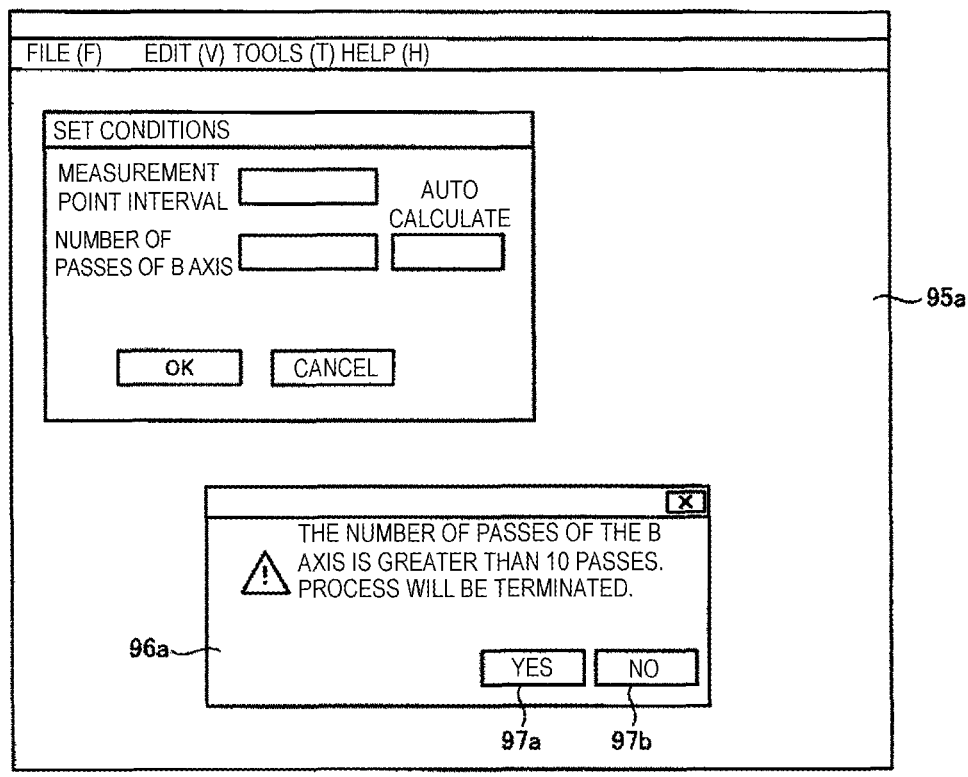
FIG. 15B is a diagram illustrating the measurement operation of the shape measurement device according to the first embodiment.
Figure 16:
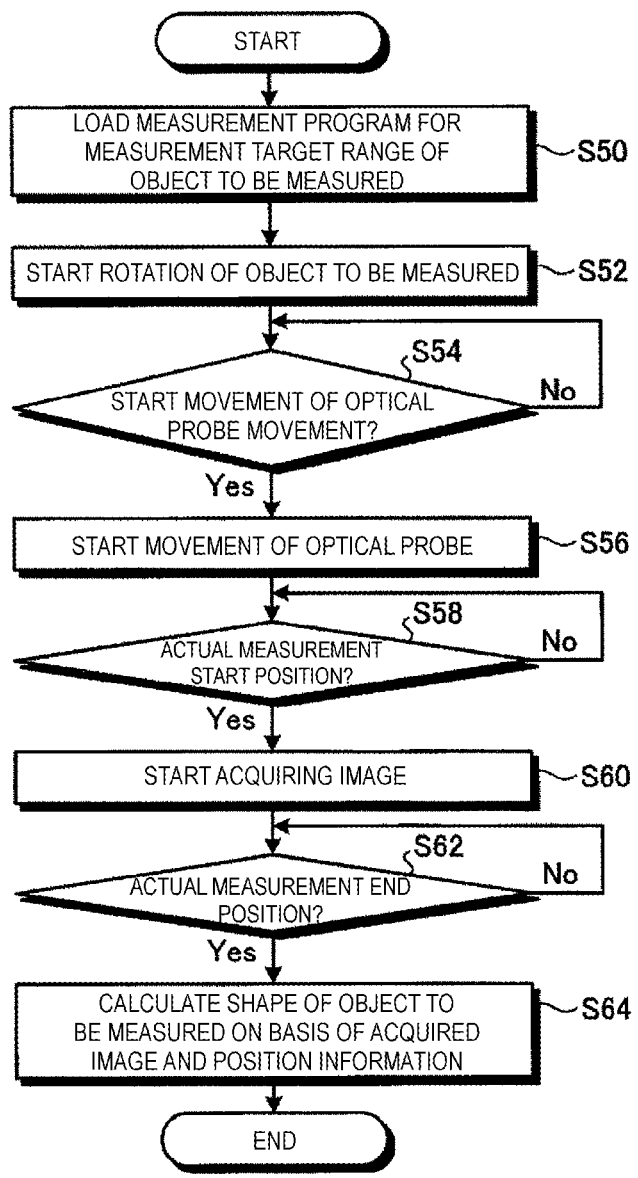
FIG. 16 is a flowchart illustrating the measurement operation of the shape measurement device according to the first embodiment.
Figure 17:
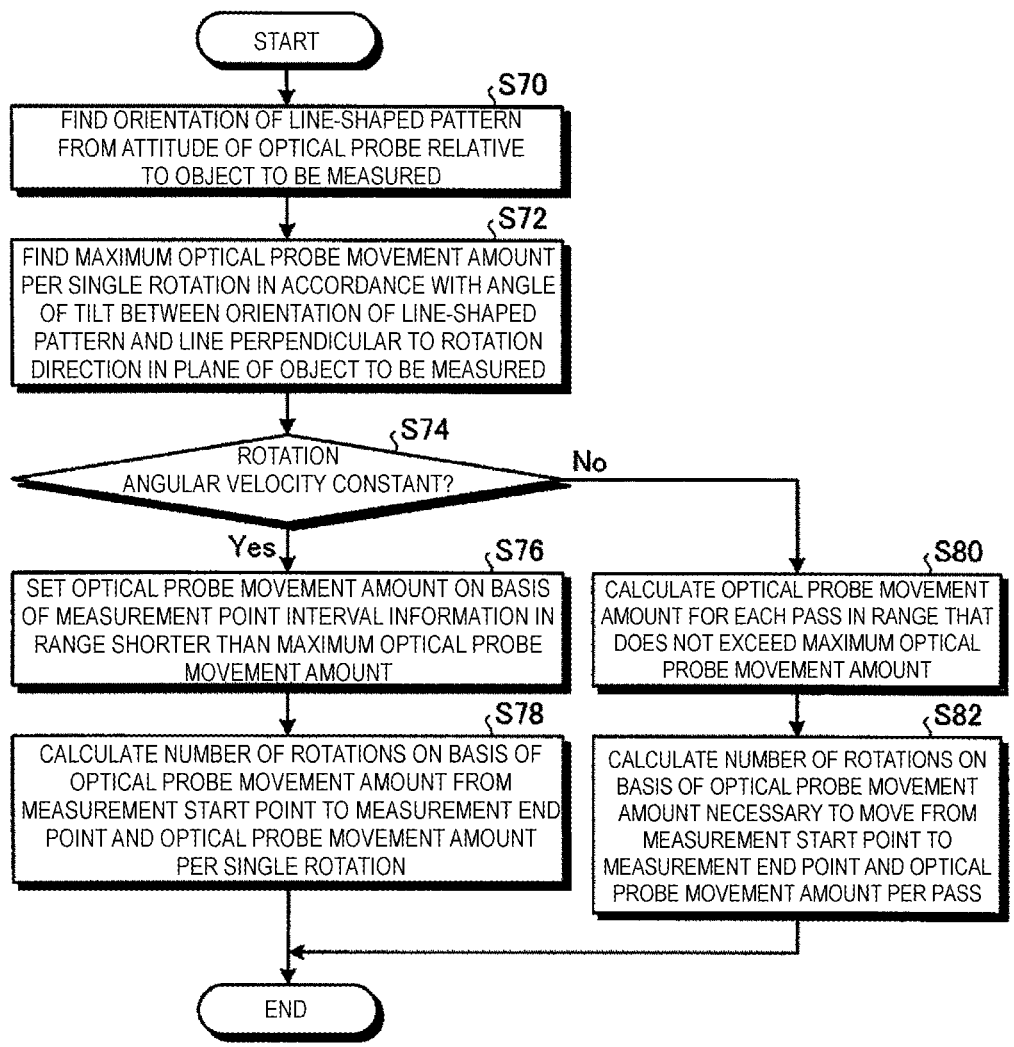
FIG. 17 is a flowchart illustrating the measurement operation of the shape measurement device according to the first embodiment.
Figure 18:
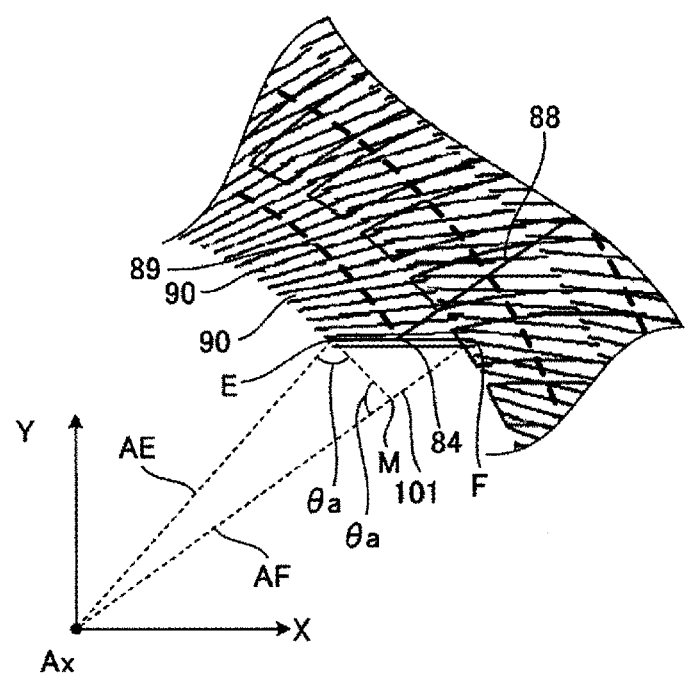
FIG. 18 is a diagram illustrating the measurement operation of the shape measurement device according to the first embodiment.

Next, an example of operations for measuring the shape of the object to be measured carried out by the shape measurement device 1 having the aforementioned configuration will be described using FIGS. 7 to 25. FIG. 8 is a diagram illustrating a measurement operation of the shape measurement device according to the first embodiment. FIG. 9 is a flowchart illustrating an example of the measurement operation of the shape measurement device according to the first embodiment. FIGS. 10 and 11 are diagrams illustrating the measurement operation of the shape measurement device according to the first embodiment. FIG. 12 is a flowchart illustrating the measurement operation of the shape measurement device according to the first embodiment. FIG. 13 is a graph illustrating the measurement operation of the shape measurement device according to the first embodiment. FIGS. 14, 15A, and 15B are diagrams illustrating the measurement operation of the shape measurement device according to the first embodiment. FIG. 16 is a flowchart illustrating the measurement operation of the shape measurement device according to the first embodiment. FIG. 17 is a flowchart illustrating the measurement operation of the shape measurement device according to the first embodiment. FIGS. 19 to 25 are diagrams illustrating the measurement operation of the shape measurement device according to the first embodiment.

The following will describe a case in which the shape measurement device 1 measures the shape of an object to be measured Ma having a repeated shape formed in the circumferential direction thereof, as illustrated in FIG. 8. The measurement target range of the object to be measured M is the entirety of a region in which teeth of a gear that serves as the object to be measured Ma in FIG. 8 are formed. Meanwhile, the shape measurement device 1 carries out the measurement with the object to be measured M placed so that a rotational center of the gear matches the rotation axis center AX of the holding/rotating device 7. The shape measurement device 1 projects the illumination light flux L onto the teeth of the object to be measured Ma to acquire an image of the pattern projected onto the object to be measured Ma, carries out processing such as that described above, and then measures the shape of the object to be measured Ma. The object to be measured Ma is a bevel gear in which teeth designed to have substantially the same shape are formed at predetermined intervals in the circumferential direction. Although a bevel gear is used as the object to be measured Ma, the shape measurement device 1 according to the present embodiment is capable of measuring shapes of objects having a variety of shapes as objects to be measured. Needless to say, in the case where the object to be measured M is a gear, the type of the gear is not particularly limited. In addition to a bevel gear, the shape measurement device 1 can take a spur gear, a helical gear, a double helical gear, a worm gear, a pinion, a hypoid gear, and the like as measurement targets, which then serve as the object to be measured Ma.

Hereinafter, an example of the processing operation performed by the shape measurement device 1 will be described using FIG. 9. The processing illustrated in FIG. 9 can be achieved by the control device 4 reading out the shape measurement program 40B stored in the storage unit 40 and executing processes using the various elements in the control device 4 on the basis of the shape measurement program 40B. Other processes that will be mentioned later are also achieved by executing processes using the various elements in the control device 4 on the basis of programs stored in the storage unit.

The control device 4 prompts the user to input initial conditions (step S8). The initial conditions include the projection direction of the line light, the orientation of the line light, the maximum allowable interval of the measurement points, and an initial measurement program inputted to set the initial measurement range. The conditions particularly include the scanning direction of the line-shaped pattern for measuring one tooth of the gear. The control device 4 sets the initial measurement range once the initial conditions have been inputted (step S10). Here, the orientation of the line light refers to the longer direction of the line light. That is, the orientation of the line light is the attitude of the measurement probe relative to the object to be measured M. To set this attitude, it is necessary to take at least the following two points into consideration. One of the points is that the image of the line light intersects with a ridgeline formed in the object to be measured M, such as a tooth trace of the gear. The other point is that the image capturing direction of the image of the line light by the image capturing device 9 of the optical probe is set so that the image of the line light is not blocked by a protruding portion formed in the object to be measured M. The maximum allowable interval of the measurement points is the maximum value of the interval from measurement point to measurement point for measuring the object to be measured. In other words, this is an allowable minimum value for a point cloud density. The initial measurement range is a range set as a reference at the start of the processing.

The control device 4, through the initial measurement range setting unit 33, sets a desired measurement range of the object to be measured M, a desired measurement pitch (point cloud pitch), and the initial shape measurement program in which a virtual scan path of the optical probe 3 is set. FIG. 10 illustrates how an initial measurement range 80 included in the initial shape measurement program is set. For an object to be measured having a non-planar repeated shape such as a gear, the shape measurement device according to the present embodiment sets one protruding portion or recessed portion of the repeated shape as a single unit of the scan path of the optical probe 3. Here, a movement amount in a direction intersecting with the rotation direction of the optical probe 3 relative to the actual measurement start position, the actual measurement end position, and a rotation cycle of the object to be measured is calculated using the set initial measurement start position, initial measurement end position, and measurement pitch information.

Note that it is possible that the initial shape measurement program have a control time chart of the probe movement device 2 and the holding/rotating device 7 so as to achieve an optimum irradiation direction of the illumination light flux L from the optical probe 3 and image capturing direction of the image capturing device 9 when measuring a base shape of the repeated shape. For example, the initial measurement range setting unit 33, on the basis of the settings of the initial shape measurement program that measures the surface of a single tooth, also acquires the attitude of the optical probe 3, or in other words, information on the orientation and the like at which the illumination light flux L is projected, and sets a direction in which the pattern is projected at each of positions in the radial direction and a direction in which the image of the projected pattern is acquired on the basis of that result. It is possible to set a direction that makes images of multiple reflected light hard to be captured, the multiple reflected light easily occurring in the valley areas between teeth. Through this, according to the present embodiment, the attitude of the optical probe 3 controlled by the probe movement device 2 can be specified. A locus along which the line-shaped pattern moves along the object to be measured M is found from this control time chart, and the initial measurement range 80 is calculated from that locus.

Then, the initial measurement range setting unit 33 sets the initial measurement range on the basis of design data of a single tooth of the object to be measured Ma, a projection position of the line light projected from the optical probe 3 when measuring a single tooth of the object to be measured Ma, scanning information thereof, and the like. The initial measurement range 80 includes an initial measurement inner-side end portion 81 and an initial measurement outer-side end portion 82, and the initial measurement range 80 is a range enclosed by the initial measurement inner-side end portion 81 and the initial measurement outer-side end portion 82.

Note that the initial measurement inner-side end portion 81 and the initial measurement outer-side end portion 82 correspond to positions of respective midpoints of the line-shaped pattern at a measurement start position on an inner diameter side and a measurement end position on an outer diameter side when measuring a single tooth. These points are set to positions that take the rotation center AX as an origin. Here, to simplify the descriptions, it is assumed that the illumination light flux L is projected in the Z-axis direction indicated in FIG. 1. However, the present teaching is not limited to this illumination direction.

The X-axis and Y-axis illustrated in FIG. 10 rotate around the rotation axis center AX relative to the object to be measured M during measurement. The initial measurement range setting unit 33 of the present embodiment generates a measurement program that measures a single repeated shape of the object to be measured M, or in other words, the surface of a single tooth. The initial shape measurement program that measures the surface of a single tooth can be generated through a known method. The initial measurement range setting unit 33 takes the end portion on the inner diameter side of the measurement range set by the initial shape measurement program that measures the surface of a single tooth as the initial measurement inner-side end portion 81 and the end portion on the outer diameter side of the measurement range as the initial measurement outer-side end portion 82, and takes a locus obtained by scanning the line-shaped pattern along the direction of the tooth trace of that single tooth between the end portions as the initial measurement range 80. Although the initial measurement range 80 is set in the present embodiment, the initial measurement range 80 may be inputted into the storage unit 40 in advance and then read out.

The locus that scans the line-shaped pattern may be projected onto the XY plane illustrated in FIG. 10, and the projected locus may then be set as the initial measurement range 80. In addition, the initial measurement range 80 is not limited to the aforementioned range, and a variety of ranges can be set.

Once the initial measurement range has been set, the control device 4 determines the actual measurement start position and the actual measurement end position on the basis of the initial measurement range (step S12). The control device 4, through the actual measurement region setting unit 34, determines the actual measurement start position and the actual measurement end position on the basis of the initial measurement range, the direction of the line light, the length of the image of the line light projected onto the object to be measured M, the approximate shape of the object to be measured, and the like. The control device 4 according to the present embodiment determines the actual measurement start position and the actual measurement end position using the initial measurement range 80 as a reference, as illustrated in FIG. 10. FIG. 10 illustrates the measurement target range of the object to be measured Ma as a hatched region and a positional relationship between the initial measurement range 80 and actual measurement start position 84, actual measurement finish position 86 relative to that region. The control device 4 according to the present embodiment extends a locus, along which the line-shaped pattern is scanned in the initial measurement range 80, toward a rotation axis center side from the initial measurement range 80 and toward the outer peripheral side opposite from the rotation axis center side. Following the extended scanning direction in the initial measurement program, the control device 4 sets, as the actual measurement start position 84, a position where an end portion of the line-shaped pattern, projected onto the object to be measured Ma, on a side farther from the rotation axis center AX makes contact with an end portion of the measurement target range of the object to be measured Ma on an inner side of the range in the radial direction or is closer to the rotation axis, and sets, as an actual measurement end position 86, a position where an end portion of the line-shaped pattern, projected onto the object to be measured Ma, on side nearer to the rotation axis center AX makes contact with an end portion of the measurement target range of the object to be measured Ma on an outer side of the range in the radial direction or is further from the rotation axis than the initial measurement end position.

The control device 4 also sets a path that connects the actual measurement start position 84 and the actual measurement end position 86 as a radial direction movement path 88. The radial direction movement path 88 is a path of relative movement of the optical probe 3 and the object to be measured Ma in the radial direction. The path of relative movement in the radial direction is a movement path that does not take into consideration relative rotation of the optical probe 3 and the object to be measured Ma. In the present embodiment, the path results in a radial direction movement path of the optical probe 3. It is possible that this path be set so as to overlap with a path set by the initial shape measurement program. In addition, the radial direction movement path does not absolutely have to be a path in a direction set progressing radially from the rotation axis center. It is sufficient for the path to be in a direction that intersects with the rotation direction of the object to be measured M.

Furthermore, the initial shape measurement program determines the position of the optical probe 3 in three-dimensional space and the direction in which the optical probe 3 projects the line-shaped pattern are set for each position where the line-shaped pattern is projected, and thus it is possible that such information be applied at each position along the radial direction movement path 88. Here, although the actual measurement start position is set to a position closer to the rotation axis Ax and the actual measurement end position is set to a position farther from the rotation axis Ax in the present embodiment, these positions may be reversed. In the case where a tilt direction of the tooth surface differs from position to position in the tooth trace, the optimum directions for the projection direction of the illumination light flux L and the image capturing direction of the image capturing device 9 will change, and it is thus possible that the movement path of the probe movement device 2 be corrected taking that directional change into consideration.

Once the actual measurement start position and the actual measurement end position have been determined, the control device 4 determines the measurement path used during actual measurement (step S14). Once the actual measurement start position and the actual measurement end position have been determined, the control device 4 determines a measurement path 89, which is a path upon the object to be measured Ma along which the pattern moves during measurement, as illustrated in FIG. 11. Here, the measurement path 89 can be determined by setting the movement velocity of the probe movement device 2 and the rotational velocity of the holding/rotating device 7 in addition to the radial direction movement path 88. The movement velocity of the probe movement device 2 can be determined in accordance with the image capturing interval of the optical probe device 3 and the measurement point interval information set by the user. The rotational velocity of the holding/rotating device 7 can also be determined in accordance with the image capturing interval of the optical probe device 3 and the measurement point interval information set by the user. Meanwhile, in the case where it is acceptable for the measurement point interval to be wider from the rotation axis center toward the outside, the rotation angular velocity of the holding/rotating device 7 can be made constant. Note that in the case where the measurement point interval is not to be changed in accordance with the measurement position relative to the rotation axis center, it is necessary to make the rotation angular velocity of the holding/rotating device 7 variable so that a rotation line velocity is constant. The rotation line velocity is a movement velocity of the pattern along a line connecting a midpoint of the pattern moving along the object to be measured Ma and the pattern. The interval of the pattern in the measurement path (the interval at which images are acquired) is constant in the case where the rotation line velocity is constant.

Although the method of setting this measurement path will be described in detail below, the number of rotations is calculated through a process carried out by the rotation number calculation unit 35 of the control device 4. The rotation number calculation unit 35 can find the minimum required number of rotations in accordance with a difference between the distances from the rotation axis Ax to each of a near region that is a region near the rotation axis Ax and a far region that is a region far from the rotation axis Ax relative to a midpoint in the longer direction of the projected line-shaped pattern, and the length of the line-shaped pattern when projected on the object to be measured. Specifically, the rotation number calculation unit 35 finds the minimum required number of rotations in accordance with the length from the position of the actual measurement region closest to the rotation axis Ax and the position farthest from the rotation axis Ax, and the length of the line-shaped pattern when projected on the object to be measured. For example, when the object to be measured M is caused to make a single rotation relative to the optical probe 3, the line-shaped pattern can be projected onto the object to be measured M without a gap between a first pass and a second pass by moving the optical probe 3 the equivalent of one length of the line-shaped pattern in the radial direction passing through the rotation axis Ax. This means that the shape can be measured without a gap between the first pass and the second pass. Accordingly, a ratio between the length of the actual measurement region in the radial direction passing through the rotation axis Ax and the length of the line-shaped pattern indicates a minimum number of rotations at which the optical probe 3 can take a measurement without a gap arising with each pass. Note that the length from the position of the actual measurement region closest to the rotation axis AX to the position farthest from the rotation axis Ax is, in the case where the approximate shape of the object to be measured M is a round cone, a length along a conical plane thereof. Meanwhile, the path for measuring the length is not limited to a straight line, and the measurement may be taken along a curve.

Note that in actuality, the longer direction of the line-shaped pattern projected onto a measurement plane of the object to be measured is often tilted relative to a straight line passing through the rotation axis Ax in the measurement plane of the object to be measured. In such a case, as illustrated in FIG. 11, the minimum required number of rotations is found on the basis of a difference between a distance SD from the actual measurement start position 84 to the rotation axis center AX and a distance FD from the actual measurement end position 86 to the rotation axis center, and the length of the line-shaped pattern when the longer direction thereof is projected onto a line segment passing through the midpoint of the line-shaped pattern from the rotation axis center AX.

On the basis of this number of rotations, the rotation number calculation unit 35 calculates a movement amount the object to be measured M can move along the radial direction movement path 88 when the object to be measured M makes a single rotation, and sets the measurement path for the object to be measured M. As will be described later using FIG. 18, the length when the longer direction of the line-shaped pattern is projected onto a line segment passing through the rotation axis center AX and the midpoint of the line-shaped pattern is found from a difference between a distance from the rotation axis center AX to an inner diameter side end portion of the line-shaped pattern and a distance from the rotation axis center AX to an outer diameter side end portion of the line-shaped pattern. The measurement path can be determined on the basis of such information.

According to the radial direction movement path 88 illustrated in FIG. 11, an angle formed between the longer direction of the line-shaped pattern and the line segment passing through the midpoint of the line-shaped pattern from the rotation axis center AX differ between the actual measurement start position 84 and the actual measurement end position 86 set along this path 88. Accordingly, the length will differ between the actual measurement start position 84 and the actual measurement end position 86 when the longer direction of the line-shaped pattern is projected onto the line segment passing through the midpoint of the line-shaped pattern from the rotation axis center AX. In such a case, the minimum required number of rotations is found by using the shorter of the projected lengths of the line-shaped pattern, or by finding the projected lengths of the line-shaped pattern for each pass and finding the stated number of rotations from the sum of those projected lengths and the distance from the actual measurement start position to the actual measurement end position.

Here, a method for calculating a length when the projected length of the line-shaped pattern is projected onto a line segment passing through the midpoint of the line-shaped pattern from the rotation axis center AX in the case of the radial direction movement path 88 illustrated in FIG. 11 will be described. An angle formed between a straight line passing through the rotation axis center AX and the actual measurement start position 84 (a dotted line indicated by the distance SD in FIG. 11) and the line-shaped pattern at the actual measurement start position 84 is $\theta sd$. When the length in the longer direction of the line-shaped pattern at the actual measurement start position 84 is represented by d, the length when the longer direction of the line-shaped pattern is projected onto the line segment passing through the midpoint of the line-shaped pattern from the rotation axis center AX can be calculated as d×cos θsd. Next, an angle formed between a straight line passing through the rotation axis center AX and the actual measurement end position 86 (a dotted line indicated by the distance FD in FIG. 11) and the line-shaped pattern at the actual measurement end position 86 is θfd. When the length in the longer direction of the line-shaped pattern at the actual measurement end position 86 is represented by d, the length when the longer direction of the line-shaped pattern is projected onto the line segment passing through the midpoint of the line-shaped pattern from the rotation axis center AX can be calculated as d×cos θfd. The method for calculating the length when the longer direction of the line-shaped pattern is projected onto the line segment passing through the midpoint of the line-shaped pattern from the rotation axis center AX is an example of a computation method for calculating the length of a projection component of one of a pattern when projected onto an object to be measured along a line that substantially intersects with the rotation axis or a line parallel to the rotation axis, and a linear scanning range. Various types of methods, which will be described later, can be used as computation methods for calculating the length of the projection component.

Once the measurement path has been determined, the control device 4 determines the movement velocity of the optical probe 3 by the probe movement device 2 and the rotational velocity of the holding/rotating device 7 (hereinafter, referred to as a measurement movement velocity) (step S16). An example of setting the measurement velocity will be described below using FIGS. 12 and 13. Note that the processing illustrated in FIG. 12 is a method for setting the measurement velocity in the case where the movement velocity of the probe movement device 2 is constant, the rotation angular velocity is variable, and the rotation line velocity is substantially constant. In the present embodiment, an image acquisition time interval by the optical probe 3, or in other words, a sampling interval, is assumed to be a substantially constant interval (the time interval is constant).

On the basis of the measurement point interval information specified by the user, the control device 4 calculates the rotation angular velocity of the rotation axis (the rotational velocity of the holding/rotating device 7) at the actual measurement start position, or in other words, at the measurement position closest to the rotation axis center AX (step S30). Next, the control device 4 calculates the rotation angular velocity of the rotation axis (the rotational velocity of the holding/rotating device 7) at the actual measurement end position, or in other words, at the measurement position farthest from the rotation axis center AX (step S32). In other words, the control device 4 calculates the rotational velocity at each position at which the rotation line velocity becomes constant, on the basis of the measurement path and the image acquisition interval of the optical probe 3.

After calculating the rotation angular velocity at the measurement position closest to the rotation axis center AX and the rotation angular velocity at the measurement position farthest from the rotation axis center AX, the control device 4 calculates the rotation angular velocity of the rotation axis for each of driving times (step S34). Next, measurement time information is acquired on the basis of an instruction from the user or standard specification information. The control device 4 further sets the rotational velocity until the line-shaped pattern is projected at the actual measurement start position, and the rotational velocity after the line-shaped pattern is projected at the actual measurement end position and an image of the line-shaped pattern is acquired by the optical probe 3, for each unit of elapsed time. Note that the rotational velocity temporarily increases until the line-shaped pattern is projected at the actual measurement start position. The time during this accelerated operation corresponds to a time period in a segment 91 in FIG. 13. Meanwhile, the rotational velocity is temporarily reduced after the image of the line-shaped pattern has been acquired by the optical probe 3. The time during this deceleration corresponds to a time period in a segment 93 in FIG. 13. A segment 92 in FIG. 13 corresponds to the measurement time. The acceleration time 91 is an amount of time required to reach a predetermined rotational velocity at the actual measurement start position, whereas the deceleration time 93 is an amount of time required to stop the rotation after the actual measurement end position has been passed.

Once the measurement time information of the time periods 91, 92, and 93 has been set in the previous step, the control device 4 calculates a driving velocity of each of the orthogonal axes (step S36), and then terminates the process. Here, the velocity of each of the orthogonal axes is a velocity at which the object to be measured Ma and the optical probe 3 move relative to each other in the X-axis direction, the Y-axis direction, and the Z-axis direction. The velocity of each of the orthogonal axes according to the present embodiment is a velocity at which the optical probe 3 is moved by the probe movement device 2. Note that the velocity of each of the orthogonal axes is a velocity at which synchronization with the rotation axis can be achieved.

The control device 4 determines the measurement velocities in the graph illustrated in FIG. 13 through the processing illustrated in FIG. 12. In the graph illustrated in FIG. 13, the vertical axis represents velocity and the horizontal axis represents time. X in FIG. 13 represents the movement velocity in the X-axis direction. Y represents the movement velocity in the Y-axis direction. Z represents the movement velocity in the −Z axis direction. A represents the rotational velocity in a θZ direction. In addition, the range 91 represents the acceleration time. The range 92 represents the movement time, which is a time when measurement is being carried out. The range 93 represents the deceleration time. As illustrated in FIG. 13, the movement velocities in the X-axis direction, the Y-axis direction, and the Z-axis direction are constant velocities in the range 92. Meanwhile, the rotational velocity in the θZ direction gradually decreases in the range 92. Accordingly, the control device 4 reduces the rotational velocity of the object to be measured Ma during the measurement of the measurement target range of the object to be measured M as the optical probe 3 moves from an inner side toward an outer side in the radial direction. The rotation line velocity becomes constant as a result. Note that measurement results are not outputted in the time period 91 and the time period 93. Accordingly, with respect to image data acquired by the image capturing device of the optical probe 3 while the rotational velocity is increasing or decreasing, the measurement result is not outputted during acceleration or deceleration by making it possible to determine whether the image data has been captured during acceleration or deceleration using the header of the image data. To do this, flag information indicating whether or not the data is suitable for point cloud generation may be recorded into a header portion of the image data acquired by the image capturing device of the optical probe 3. Then, when the point cloud is generated by the control device 4, the point cloud generation process may be carried out while determining whether or not the image data can be used in the point cloud generation on the basis of the information recorded in the header portion of the image data. Note that the flag indicating whether or not the image data can be used in the point cloud generation, which is not limited only to the rotational velocity of the rotating table, may be selectively used on the basis of the increase/decrease in the movement velocity of the probe movement device 2. In addition, rather than determining whether or not the point cloud generation process can be carried out on the basis of whether the relative movement velocity of the optical probe 3 and the object to be measured Ma during image data acquisition is increasing or decreasing, it may be determined whether or not the relative movement velocity is greater than or equal to a predetermined velocity.

In the case where an optical probe 3 that acquires an image of line light using an image capturing device at a constant frame rate is used and the relative movement velocity of the optical probe 3 and the object to be measured Ma is increasing or decreasing as described here, the interval of point cloud data obtained from the image information of the optical probe 3 will change in accordance with the chance in velocity. Such a change in the interval of point cloud data will affect a subsequent coordinate interpolation process, error reduction process, and the like. With the shape measurement device according to the present embodiment, image data captured in acceleration/deceleration periods can be distinguished by detecting a state of acceleration/deceleration in each movement device or rotation device.

Once the measurement velocity has been set, the control device 4 determines a point cloud generation range within the field of view that can be captured by the image capturing device 9 (step S18). The point cloud generation range is a range in the image captured by the image capturing device 9 that is used to generate a point cloud. The control device 4 acquires a pattern 90*a* of an image captured by the image capturing device 9, as illustrated in FIG. 14. In the case where the control device 4 measures the surface of a single tooth, a region in the image having the pattern 90*a* located in the center thereof serves as a point cloud generation range 94. As opposed to this, the control device 4 according to the present embodiment measures the shapes of all of the teeth, and thus a range including not only the pattern 90*a* in the center but also an end of a pattern 90*a* projected on another tooth can be set as a point cloud generation range 94*a*.

Once the point cloud generation range has been determined, the control device 4 generates a measurement program for measuring the measurement object Ma including a lighting control system, a measurement coordinate calculation region, and the like, or in other words, a measurement program for measuring the entirety of the measurement target range of the object Ma to be measured (step S19), and stores the program in the storage unit 40. On the basis of the determined measurement path, measurement velocity, and point cloud generation range, the control device 4 determines a movement path by the probe movement device 2 in the X, Y, and Z-axis directions, a rotational velocity by the holding/rotating device 7 in the Zθ direction, an image acquisition timing by the optical probe 3, and the like, and generates a shape measurement program for causing each of the elements to operate on the basis of the determined operation. The control device 4 stores the generated shape measurement program in the storage unit 40. In this case, the measurement program for the measurement target range of the object to be measured Ma may be stored as part of the shape measurement program 40B, or may be stored as a separate program.

The control device 4 determines whether or not the calculated measurement time, the calculated number of rotations of the holding/rotating device 7, and the like in the shape measurement program are within the range of tolerance (step S20). The calculated conditions refer to the measurement path, the measurement velocity, and the like. The measurement path includes the number of passes of the pattern, or in other words, the number of times the pattern rotates on the object to be measured Ma from the actual measurement start position to the actual measurement end position, the movement velocity of the optical probe in the X, Y, and Z-axis directions (primarily the X and Y-axis directions), and the like. The control device 4 determines whether these conditions fall within the range of tolerance, which is set in advance. In the case where the control device 4 has determined that the calculated conditions are within the range of tolerance (Yes in step S20), the process terminates here.

In the case where it has been determined that the calculated conditions are not within the range of tolerance (No in step S20), the control device 4 displays an error screen (step S24), prompts the user to set the initial conditions again, and the process returns to step S01. The control device 4 causes an error screen 95 such as that illustrated in FIG. 15A to be displayed in the display device 5. The error screen 95 is a screen in which a window 96 indicating an error is displayed on an uppermost display layer of a screen including a window for setting conditions and the like. The error screen 95 is a screen to be displayed in the case where the number of passes has exceeded the range of tolerance. The window 96 includes a message indicating that a B-axis number of passes, or in other words, the number of rotations in the θZ direction, exceeds the range of tolerance of 100 passes. A high number of passes may be due to that the length of the time period 92 is extremely long; thus the message indicating that the number of rotations has exceeded the range of tolerance is outputted to provide a warning that the measurement time will increase. Although in the present embodiment, the determination is applied to a case where the number of rotations has exceeded the range of tolerance, the determination may be carried out on the basis of the measurement time.

The control device 4 displays an error screen and terminates the processing in the aforementioned embodiment, but is not limited thereto. The control device 4 may generate the measurement program for the measurement target range of the object to be measured Ma in response to a user instruction, even under conditions that exceed the range of tolerance. The control device 4 displays an error screen 95*a* illustrated in FIG. 15B. The error screen 95*a* is a screen in which a window 96*a* indicating an error is displayed on the uppermost display layer of a screen including the window for setting conditions and the like. The window 96*a* includes a message indicating that the B-axis number of passes, or in other words, the number of rotations in the θZ direction, exceeds a range of tolerance of 10 passes, as well as buttons 97*a* and 97*b*. The button 97*a* is a button corresponding to an instruction for continuing the processing, or in other words, corresponding to an instruction for generating the measurement program for the measurement target range of the object to be measured Ma under the current conditions. The button 97*b* is a button corresponding to an instruction for terminating the processing, or in other words, corresponding to an instruction to not generate the measurement program. The user selects either of the buttons 97*a* and 97*b* displayed in the error screen to input an instruction as to whether or not to generate the measurement program for the measurement target range of the object to be measured Ma. The control device 4 executes processing on the basis of the inputted instruction. Through this, the control device 4 can generate the measurement program for the measurement target range of the object to be measured Ma in response to the user instruction, even under conditions that exceed the range of tolerance.

Next, processing operations executed by the shape measurement device 1, or in other words, measurement operations, using the generated measurement program for measuring the entirety of the measurement target range of the object to be measured Ma (also called a measurement program for the measurement target range of the object to be measured M) will be described using FIG. 16. The control device 4 loads the measurement program for the measurement target range of the object to be measured M generated as per FIG. 9 (step S50), and starts processing on the basis of the loaded measurement program.

The control device 4 drives the holding/rotating device 7 and starts to rotate the object to be measured Ma (step S52). Upon having started to rotate the object to be measured Ma, the control device 4 determines whether to start to move the optical probe 3 (step S54). Upon having determined not to start to move the optical probe 3 (No in step S54), the control device 4 causes the process to return to step S54 and carries out the determination in step S54 again. This determination is made as to whether or not the rotation angular velocity of the holding/rotating device 7 has reached a predetermined velocity.

Upon having determined to start to move the optical probe 3 (Yes in step S54), the control device 4 causes the probe movement device 2 to start to move the optical probe 3 (step S56). Here, on the basis of the acceleration time, the control device 4 causes the optical probe 3 to move to the actual measurement start position when the measurement is to start.

Upon having started to cause the optical probe 3 to move, the control device 4 determines whether or not the optical probe 3 is positioned at the actual measurement start position (the actual measurement start position) (step S58). Upon having determined that the position is not the actual measurement start position (No in step S58), the control device 4 causes the process to return to step S58 and carries out the determination in step S58 again.

Upon having determined that the position is the actual measurement start position (Yes in step S58), the control device 4 starts to project the pattern using the optical probe 3. In addition, when the line-shaped pattern has been projected at the actual measurement start position, the acquisition of the image is also started (step S60). Until the measurement ends, the control device 4 repeatedly captures an image of the pattern at a predetermined interval in accordance with the shape measurement program for the measurement target range of the object to be measured Ma while moving the pattern and the object to be measured M relative to each other.

Upon having started to acquire the image, the control device 4 determines whether the position is the actual measurement end position (step S62). Upon having determined that the position is not the actual measurement end position (No in step S62), the control device 4 causes the process to return to step S62 and carries out the determination in step S62 again.

Upon having determined that the position is the actual measurement end position (Yes in step S62), the control device 4 controls the probe to terminate the acquisition of images with the image capturing device 9 or the projection of the line-shaped pattern (step S64). Then, the shape of the object to be measured Ma is calculated on the basis of the acquired images and the position information, and the present processing terminates.

As described thus far, the shape measurement device 1 according to the present embodiment calculates the actual measurement start position and the actual measurement end position on the basis of the initial measurement range and the measurement target range of the object to be measured M as well as the orientation in the longer direction of the line-shaped pattern, and then calculates the measurement path. The movement direction and movement velocity per scanning position of the probe movement device 3 and the rotational velocity of the holding/rotating device 7 are calculated on the basis of the measurement path; thus, a shape measurement program can be generated for the entirety of the measurement target range. Then, on the basis of the generated measurement program, an image of the entirety of the measurement target range of the object to be measured Ma, or in other words, an image of the entire circumference of the object to be measured Ma is captured, while moving the object to be measured Ma and the line-shaped pattern relative to each other. The shape measurement device 1 carries out calculation processing on the basis of the image of the entirety of the measurement target range of the object to be measured Ma and the relative positions at which the image is captured, and calculates a shape (a three-dimensional shape) of the entirety of the measurement target range of the object to be measured Ma.

Through this, the shape measurement device 1 can measure the shape of the entirety of the measurement target range of the object to be measured Ma while maintaining a state in which the object to be measured Ma and the pattern are moving relative to each other, or in other words, without stopping the relative movement of the object to be measured Ma and the pattern. Accordingly, time loss resulting from stopping the relative movement of the object to be measured Ma and the pattern, accelerating and deceleration, or the like can be reduced, and the shape of the object to be measured Ma can be measured in a short amount of time. In addition, because the shape measurement device 1 can create the measurement program on the basis of the initial measurement range and various types of conditions, the measurement program can be simplified. This makes it possible to reduce the processing load during measurement.

In addition, in the case where the measurement time or the number of rotations for measuring the shape of the object to be measured Ma falls outside the range of tolerance, the shape measurement device 1 can make a notification of the fact that the measurement time or the number of rotations falls outside the range of tolerance so as to suppress a measurement from being taken through ineffective measurement operations. The display device 5 is used as a notification unit that notifies the user in the present embodiment, but is not limited thereto. The shape measurement device can also use an audio output device, a printer, or the like as the notification unit that conveys information to the user. Meanwhile, it is possible that the shape measurement device 1 display, in a display unit, the measurement time for measuring the shape of the object to be measured Ma calculated on the basis of the number of rotations or the measurement path set by the measurement path setting unit 36. This can notify the user of the measurement conditions in an easily-understandable manner.

In addition, the shape measurement device 1 may make a notification of the conditions that can be adjusted in order to bring the number of rotations or the measurement time into the range of tolerance using the error screen. For example, in the case where the number of rotations or the measurement time has exceeded the range of tolerance, the shape measurement device 1 may make a notification of that the orientation of the optical probe 3 should be tilted from a direction nearly tangential to the rotation direction to a direction parallel to the radial direction. This can guide the user to reduce the number of rotations or the measurement time.

In addition, it is possible that the shape measurement device 1 set one of the initial inner-side end portion and the initial outer-side end portion as the initial measurement start position when settings are made and set the other of the initial inner-side end portion and the initial outer-side end portion as the initial measurement end position when settings are made, as in the present embodiment. Setting the end portions of the initial measurement range to the inner diameter side end portion and the outer diameter side end portion of the object to be measured Ma in this manner, the measurement path can be set to a single continuous line. As a result, the shape measurement device 1 can acquire an image of the entire surface of of the object to be measured Ma by moving the pattern and the object to be measured Ma in one direction on the XY plane while rotating the pattern and the object to be measured Ma relative to each other. Accordingly, a movement error arising in the case where the pattern and the object to be measured Ma are moved in both directions on the XY plane can be suppressed from arising, which makes it possible to increase the measurement accuracy.

Here, the shape measurement device 1 according to the present embodiment takes the actual measurement start position and the actual measurement end position as positions moved in the radial direction using the initial measurement start position and the initial measurement end position of the initial measurement range as references. Specifically, the position of whichever of the actual measurement start position or the actual measurement end position is set further on the inner side in the radial direction than the initial inner-side end portion is set to be even closer to the rotation axis, and a position of whichever of the actual measurement start position or the actual measurement end position is set further on the outer side in the radial direction from the outer-side end portion is set to be further on the outer side in the radial direction. Through this, the shape of the entirety of the measurement target range of the object to be measured Ma can be measured with more certainty. Note that the shape measurement device may set the actual measurement start position and the actual measurement end position to the same positions as the initial measurement start position and the initial measurement end position of the initial measurement range.

In addition, in the case where, as in the present embodiment, line light is projected from the optical probe 3 as the illumination light flux L and an image of the line-shaped pattern reflected by the object to be measured Ma is captured, and in the case where the line-shaped pattern has been projected onto one of the actual measurement start position and the actual measurement end position that is set on the inner diameter side, the measurement path setting unit 36 sets one of the end portions of the line-shaped pattern to a position that makes contact with an inner-side end portion of the measurement region of the object to be measured Ma on the rotation axis side or a position closer to the rotation axis than the measurement region. To be more specific, it is possible that, when the line-shaped pattern has been projected onto the object to be measured Ma at the position of whichever of the initial measurement start position and the initial measurement end position is closer to the rotation axis, the position be set closer to the rotation axis than the measurement region of the object to be measured Ma on the basis of a difference between the distances from the rotation axis of the object to be measured M and the near region and far region, the near region being a region closer to the rotation axis relative to the midpoint of the longer direction of the projected line-shaped pattern and the far region being a region farther from the rotation axis relative to the stated midpoint. In addition to this, it is possible that whichever of the actual measurement start position or the actual measurement end position is closer to the rotation axis than the measurement region be set closer to the rotation axis on the basis of a difference between a distance from a position closest to the rotation axis to the rotation axis and a distance from a position farthest from the rotation axis to the rotation axis when the line-shaped pattern is projected onto the object to be measured M. Furthermore, in addition to this, it is possible that whichever of the actual measurement start position and the actual measurement end position is closer to the rotation axis than the measurement region be set closer to the rotation axis on the basis of a difference between a distance from the end portion of the line-shaped pattern that is closer to the rotation axis to the rotation axis and a distance from the end portion of the line-shaped pattern that is farther from the rotation axis to the rotation axis.

Furthermore, in the case where the line-shaped pattern has been projected onto the other of the actual measurement start position or the actual measurement end position that is set on the outer diameter side, the measurement path setting unit 36 sets the other of the end portions of the line-shaped pattern to a position that makes contact with an outer-side end portion of the measurement region of the object to be measured Ma on the rotation axis side or a position further from the rotation axis than the measurement region. To be more specific, it is possible that, when the line-shaped pattern has been projected onto the object to be measured Ma at the position of whichever of the initial measurement start position and the initial measurement end position is further from the rotation axis, the position be set further from the rotation axis than the measurement region of the object to be measured Ma on the basis of a difference between the distances from the rotation axis of the object to be measured M and the near region and far region, the near region being a region closer to the rotation axis relative to the midpoint of the longer direction of the projected line-shaped pattern and the far region being a region farther from the rotation axis relative to the stated midpoint. In addition to this, it is possible that whichever of the actual measurement start position and the actual measurement end position is further from the rotation axis than the measurement region be set further from the rotation axis on the basis of a difference between a distance from a position of the line-shaped pattern that is closest to the rotation axis to the rotation axis and a distance from a position of the line-shaped pattern that is farthest from the rotation axis to the rotation axis when the line-shaped pattern is projected onto the object to be measured M. Furthermore, in addition to this, it is possible that whichever of the actual measurement start position and the actual measurement end position is closer to the rotation axis than the measurement region be set to a position further from the rotation axis on the basis of a difference between a distance from the end portion of the line-shaped pattern that is closer to the rotation axis to the rotation axis and a distance from the end portion of the line-shaped pattern that is farther from the rotation axis to the rotation axis. Through this, the shape measurement device 1 can measure the shape of the entirety of the object to be measured Ma with more certainty.

Note that in the case where the actual measurement start position or the actual measurement end position has been set to a position closer to the rotation axis than the measurement region or a position further from the rotation axis than the measurement region, the projection of the line-shaped pattern may be started or ended at the actual measurement start position or the actual measurement end position. At this time, it does not absolutely matter whether or not the image of the pattern projected onto the object to be measured M by the optical probe 3 is captured by the imaging element 20. Note that the position at which the imaging element 20 begins capturing the image of the pattern projected by the optical probe 3 may be separately set to between the initial measurement start position and the actual measurement start position, and likewise, the position at which the image of the pattern stops being captured may be set to between the initial measurement end position and the actual measurement end position.

Next, an example of a method for calculating the number of rotations (rotation amount) will be described using FIGS. 17 to 25. The example illustrated in FIG. 17 is an example of a method for calculating the number of rotations for both the case where the rotational velocity of the object to be measured Ma is constant and the case where the rotational velocity is variable. Note that in FIGS. 19, and 20A to 20C, the positions of the actual measurement start position and the actual measurement end position in the rotation direction are different from the positions indicated in FIGS. 10 and 11.

The rotation number calculation unit 35 of the control device 4 finds the orientation of the line-shaped pattern from the attitude of the optical probe relative to the object to be measured Ma (step S70). Upon having found the orientation of the line-shaped pattern, the control device 4 finds the maximum optical probe movement amount per single rotation in accordance with an angle of tilt between the orientation of the line-shaped pattern and a line perpendicular to the rotation direction in the measurement plane of the object to be measured Ma (step S72). This maximum optical probe movement amount is the same as a length when the pattern projected onto the object to be measured is projected onto a line that substantially intersects with the rotation axis and that intersects with the line-shaped pattern projected onto the object to be measured. A method for finding the maximum optical probe movement amount per single rotation will be described using FIG. 18. A line segment AE connecting an upper end portion E of the line-shaped pattern to the rotation axis center and a line segment AF connecting a lower end portion F of the line-shaped pattern to the rotation axis center are found. Of course, the positions of the upper end portion E and the lower end portion F at this time need only correspond to the positions when the line light is projected onto the measurement plane of the object to be measured Ma. A difference between the lengths of the straight line AE and the straight line AF (a line segment MF (101)) serves as the maximum optical probe movement amount per single rotation. In other words, the difference between the straight line AE and the straight line AF is constant at any position when the direction in which a single tooth's worth of the measurement path extends is located upon a straight line passing through the rotation axis center, and thus the difference between the line segment AE and the line segment AF may be found at any desired position where the line-shaped pattern is projected. Here, respective angles formed between a line connecting the portion of the straight line AF excluding the line segment MF 101 to the straight line AE and the straight lines AF and AE are the same angle of θa. The method for calculating the difference between the two straight lines AE and AF is an example of a computation method that calculates the length of a projection component of one of a pattern when projected onto an object to be measured along a line that substantially intersects with the rotation axis or a line parallel to the rotation axis, and a linear scanning range. The maximum optical probe movement amount per single rotation is a movement amount of the optical probe 3 resulting in a state where the line-shaped pattern makes contact with the same position in the rotation direction upon a single rotation being made. Note that the optical probe movement amount per single rotation is set to be shorter than that length. A reference for the actual optical probe movement amount (per single rotation) is that only several pixels overlap in a range in which an outer peripheral side portion of the line-shaped pattern is visible when the image of the illumination light flux L is projected by the optical probe 3. In this embodiment, the length when the line-shaped pattern is projected is found using a difference between the distance from one end portion of the line-shaped pattern to the rotation axis center and the distance from the other end portion of the line-shaped pattern to the rotation axis center, without directly finding the length when the line-shaped pattern is projected onto a straight line extending from the rotation axis center AX to the line-shaped pattern. Finding the length from the difference between the respective distances from the rotation axis center to the ends of the line-shaped pattern in this manner rather than directly finding the projected length is also included in the concept of the present teaching.

Once the rotation number calculation unit 35 of the control device 4 has found the maximum optical probe movement amount per single rotation, the measurement path setting unit 36 determines whether the rotation angle is constant, as a measurement condition (step S74). The measurement path setting unit 36 of the control device 4 determines whether the velocity at which the object to be measured Ma is rotated is set to be constant, and whether the rotation line velocity at which the relative velocity of the optical probe is constant at a position of the object to be measured Ma where the line-shaped pattern is projected is set to be constant.

In the case where the measurement path setting unit 36 of the control device 4 has determined that the rotation angular velocity is constant (Yes in step S74), the optical probe movement amount is set to a shorter range than the maximum optical probe movement amount on the basis of the measurement point interval information (step S76), and the rotation number calculation unit 35 calculates the number of rotations on the basis of the optical probe movement amount from the actual measurement start position to the actual measurement end position and the optical probe movement amount per single rotation (step S78), after which the process terminates.

In the case where the measurement path setting unit 36 of the control device 4 has determined that the rotation angle is not constant and the rotation line velocity is constant (No in step S74), the optical probe movement amount for each pass is calculated in a range that does not exceed the maximum optical probe movement amount (step S80), and the rotation number calculation unit 35 calculates the number of rotations on the basis of the optical probe movement amount required to move from the actual measurement start position to the actual measurement end position (a movement velocity of the optical probe for each pass) and the optical probe movement amount for each pass (step S82), after which the process terminates. Note that it is possible that the movement of the optical probe be controlled so that the rotation line velocity is constant and driving velocities of driving units 50X, 50Y, and 50Z (at orthogonal axes) of the probe movement device 2 are substantially constant. Accordingly, in this case, it is possible that the driving velocities of the driving units be set on the basis of the rotation angular velocity when the region where the line-shaped pattern is projected is located on the outermost peripheral side of the measurement target range and the time taken to make a single rotation at that rotation angular velocity, and the maximum probe movement amount or a movement amount that is lower than that movement amount.

Figure 19:
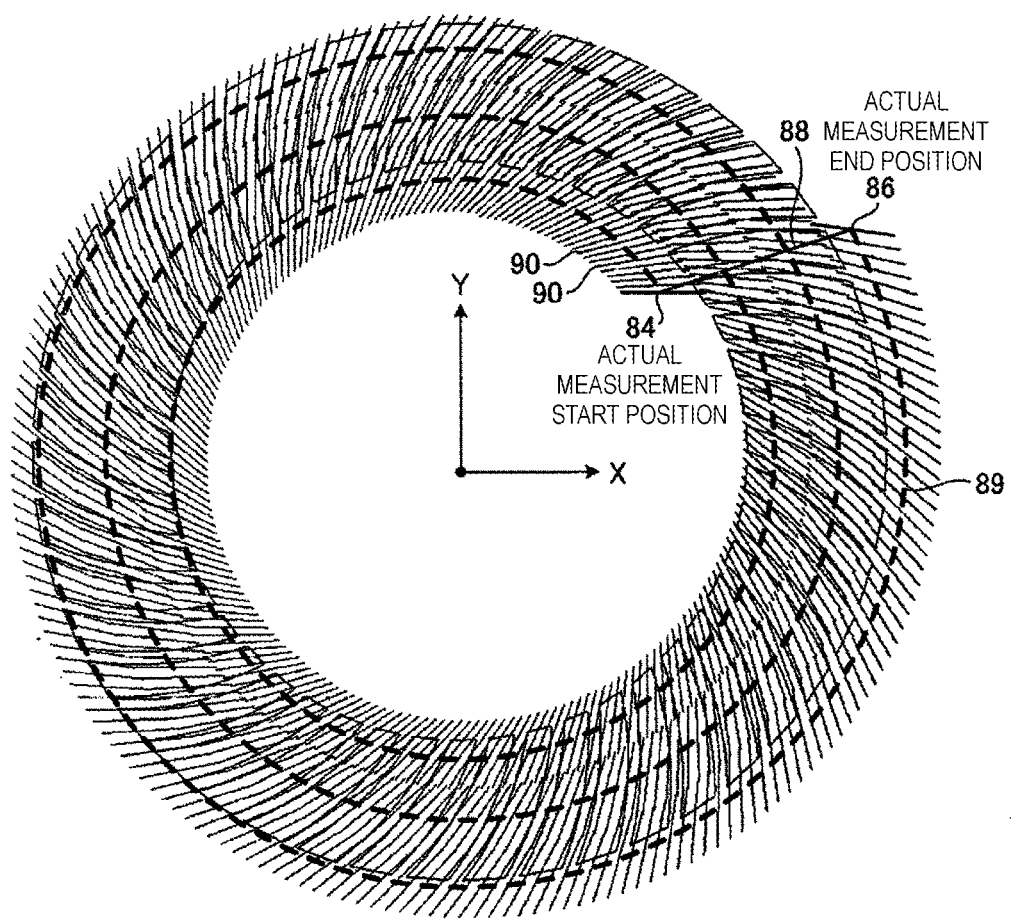
FIG. 19 is a diagram illustrating the measurement operation of the shape measurement device according to the first embodiment.
Figure 20A:
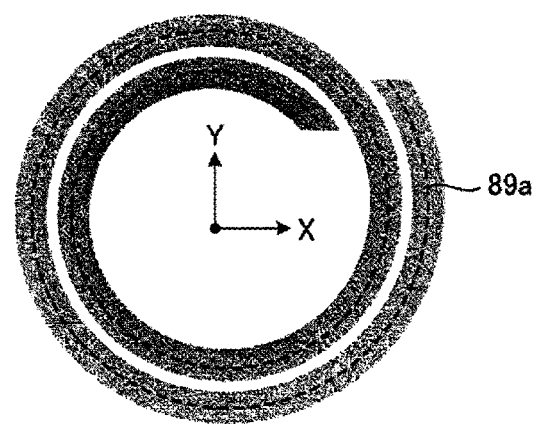
FIG. 20A is a diagram illustrating the measurement operation of the shape measurement device according to the first embodiment.
Figure 20B:
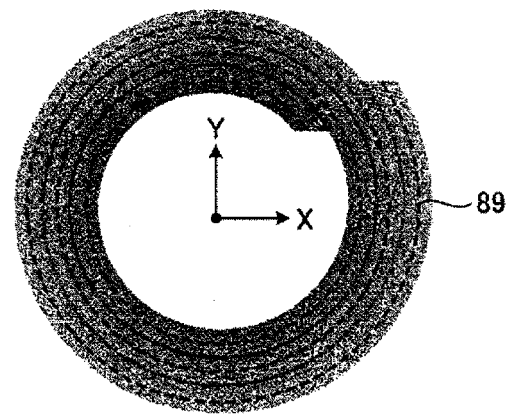
FIG. 20B is a diagram illustrating the measurement operation of the shape measurement device according to the first embodiment.
Figure 20C:
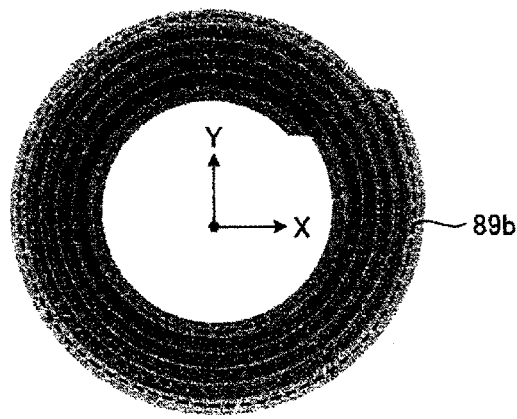
FIG. 20C is a diagram illustrating the measurement operation of the shape measurement device according to the first embodiment.
Figure 21:
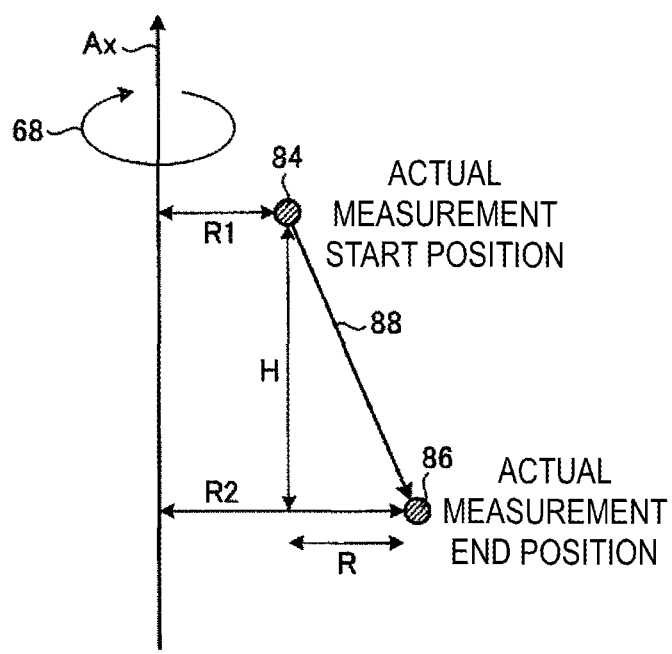
FIG. 21 is a diagram illustrating the measurement operation of the shape measurement device according to the first embodiment.
Figure 22:
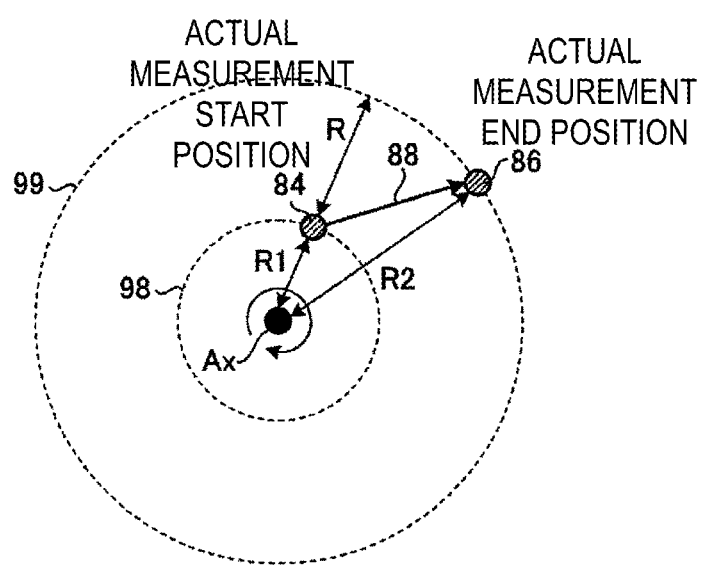
FIG. 22 is a diagram illustrating the measurement operation of the shape measurement device according to the first embodiment.

The control device 4 specifies the length at which the pattern is projected onto the object to be measured Ma during rotation from the shape of the object to be measured Ma and a measurement data acquisition range, calculates the maximum optical probe movement amount when the object to be measured M makes a single rotation, and calculates the number of rotations on the basis of the maximum optical probe movement amount per single rotation and the length from the inner side to the outer side of the measurement target range. Through this, as illustrated in FIG. 19, the number of rotations a pattern 90 is projected can be calculated for the entirety of the measurement target range of the object to be measured Ma (the range for measuring the shape), and the measurement path 89 along which the pattern moves can be determined in accordance with the number of rotations. Note that the actual measurement region is a region in which the pattern 90 is disposed at substantially equal intervals in the circumferential direction, as illustrated in FIG. 19. The actual measurement region is a region in which the pattern 90 is projected by tracing the locus of the midpoint of the line-shaped pattern along a measurement path that connects the actual measurement start position 84 and the actual measurement end position 86 (the dotted line in FIG. 19). Through this, the control device 4 can suppress a gap from arising between passes of the pattern 90 that are adjacent in the circumferential direction as indicated by a measurement path 89*a* illustrated in FIG. 20A, can suppress the number of rotations from increasing and the amount by which passes of the pattern 90 that are adjacent in the circumferential direction overlap with each other from increasing as indicated by a measurement path 89*b* illustrated in FIG. 20C, and can ensure an overlapping number of rotations and measurement path while also reducing the amount by which passes of the pattern 90 that are adjacent in the circumferential direction overlap with each other, as indicated in FIG. 20B.

Here, a method for estimating the shape of the object to be measured Ma, a method for finding the measurement data acquisition range, and a method for finding the rotation amount (number of rotations) from the shape of the object to be measured and the measurement data acquisition range will be described with reference to FIGS. 21 to 25.

The rotation number calculation unit 34 of the control device 4 estimates the actual measurement region on the basis of the actual measurement start position 84 and the actual measurement end position 86 of the radial direction movement path 88 set by the measurement path setting unit 36. Here, the radial direction movement path 88 is a path set by the user or a path calculated by the control device 4 measuring the shape of a part of the object to be measured. In addition, the radial direction movement path 88 is a path that travels along part of a straight line that passes through the rotation axis center AX. On the basis of a line connecting the actual measurement start position 84 and the actual measurement end position 86, the control device 4 according to the present embodiment cuts out a part of a tip portion of the object to be measured and models that portion as a conical shape having a trapezoidal cross-section. The shape in the case of estimating the shape of the object to be measured is not limited to a cone obtained by cutting out part of the tip portion, and may be a circular column instead.

On the basis of a positional relationship between the actual measurement start position 84, the actual measurement end position 86, and the rotation axis center Ax, the rotation number calculation unit 34 of the control device 4 calculates a distance R1 between the rotation axis center Ax and the actual measurement start position 84 in the radial direction, a distance R2 between the rotation axis center Ax and the actual measurement end position 86 in the radial direction, a distance R between the actual measurement start position 84 and the actual measurement end position 86 in the radial direction. Here, the distances in the radial direction are calculated using an inner diameter 98 that is a circle taking the rotation axis center Ax as a center and passing through the actual measurement start position 84 and an outer diameter 99 that is a circle taking the rotation axis center Ax as a center and passing through the actual measurement end position 86. On the basis of the positional relationship between the actual measurement start position 84, the actual measurement end position 86, and the rotation axis center Ax, the control device 4 calculates a distance H between the actual measurement start position 84 and the actual measurement end position 86 in the direction that follows the rotation axis center Ax.

Figure 23:
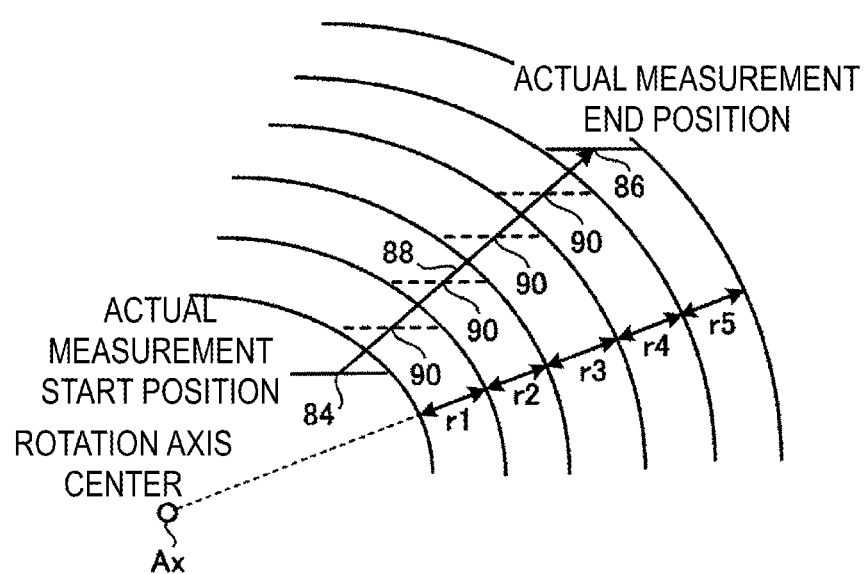
FIG. 23 is a diagram illustrating the measurement operation of the shape measurement device according to the first embodiment.

Next, as illustrated in FIG. 23, the rotation number calculation unit 35 of the control device 4 estimates a projection component of the pattern 90 in the radial direction that intersects with the rotation axis Ax in the case where the shape of the object to be measured Ma is irradiated with the illumination light flux L, on the basis of the estimated shape of the object to be measured Ma and the orientation in the longer direction of the line-shaped pattern. The control device 4 divides the distance R between the actual measurement start position 84 and the actual measurement end position 86 in the radial direction by the length of the pattern 90 and calculates a number of divisions. In the example illustrated in FIG. 23, the radial direction movement path 88 of the distance R between the actual measurement start position 84 and the actual measurement end position 86 in the radial direction is divided into five segments, namely r1, r2, r3, r4, and r5. Here, in the present embodiment, r1=r2=r3=r4=r5. The control device 4 estimates that the pattern 90 can be moved without gaps by making five passes from the actual measurement start position 84 to the actual measurement end position 86.

Figure 24:
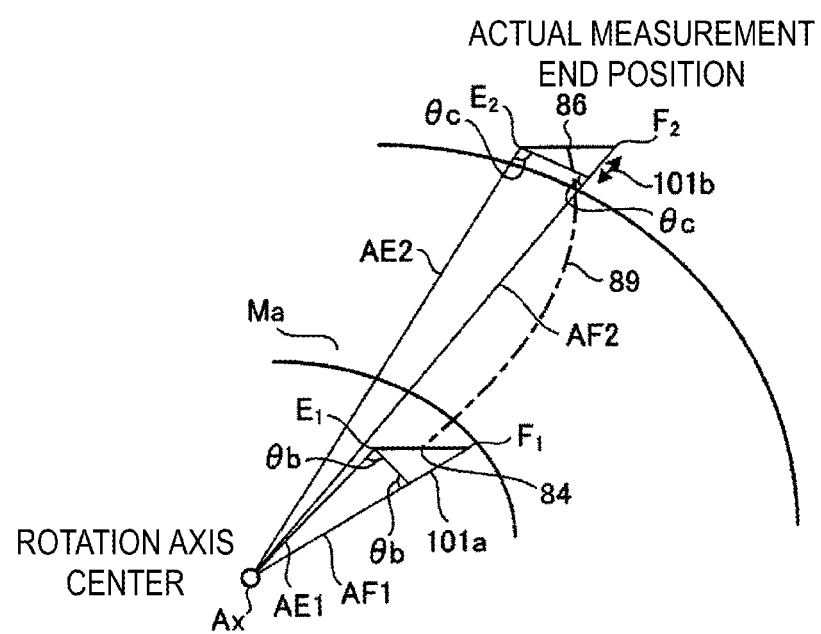
FIG. 24 is a diagram illustrating the measurement operation of the shape measurement device according to the first embodiment.

Note that the above applies in the case where the direction of the measurement path for a single tooth is set to be on a straight line that intersects with the rotation axis, but in the case where the measurement path deviates therefrom, the maximum optical probe movement amount will differ from pass to pass. For example, as illustrated in FIG. 24, a large difference arises between the actual measurement start position 84 and the actual measurement end position 86 in the measurement of each tooth. Specifically, in FIG. 24, a line segment 101*a* represents a difference in the lengths of a straight line AE1 and a straight line AF1 at the actual measurement start position 84. Here, respective angles formed between a line connecting the portion of the straight line AF1 excluding the line segment 101*a* to the straight line AE1 and the straight lines AF and AE are the same angle of θb. A line segment 101*b* represents a difference in the lengths of a straight line AE2 and a straight line AF2 at the actual measurement end position 86. Here, respective angles formed between a line connecting the portion of the straight line AF2 excluding the line segment 101b to the straight line AE2 and the straight lines AF2 and AE2 are the same angle of θc. The angle θb and the angle θc are different angles. The line segment 101a and the line segment 101b thus have different lengths, resulting in a large difference. In this manner, it is possible that, of differences between the length of a line segment from the rotation axis center to the upper end portion of the line-shaped pattern and the length of a line segment from the rotation axis center to the lower end portion of the line-shaped pattern, the length where that difference is minimum be set as the maximum probe movement amount.

Figure 25:
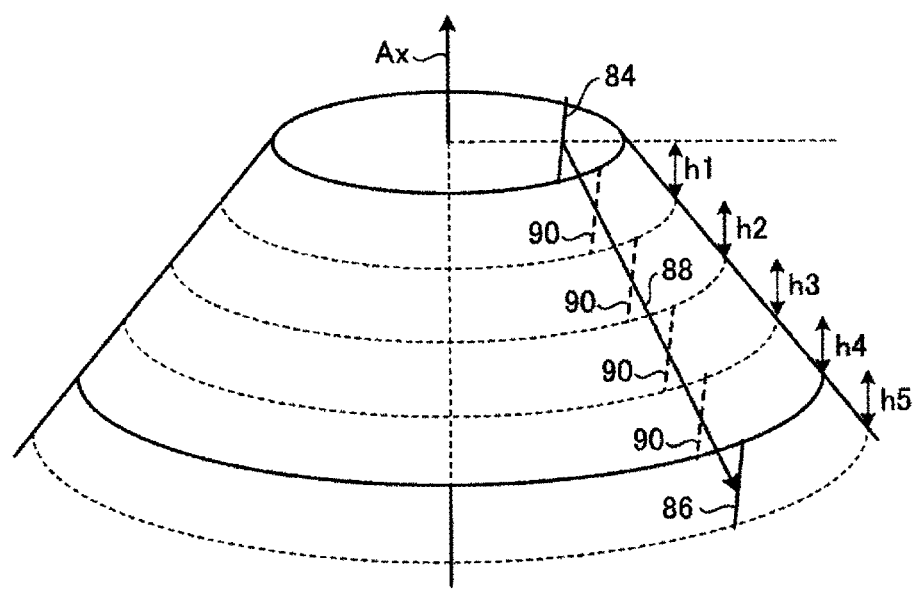
FIG. 25 is a diagram illustrating the measurement operation of the shape measurement device according to the first embodiment.

Next, as illustrated in FIG. 25, the rotation number calculation unit 35 of the control device 4 estimates shape of the pattern 90 in the rotation axis center Ax direction in the case where the shape of the object to be measured Ma is irradiated with the illumination light flux L, on the basis of the estimated shape of the object to be measured Ma and the orientation of the rotation axis direction of the line-shaped pattern. The control device 4 divides the distance H between the actual measurement start position 84 and the actual measurement end position 86 in the direction following the rotation axis center Ax by the length of the pattern 90 in the rotation axis center Ax direction and calculates a number of divisions. In the example illustrated in FIG. 25, the radial direction movement path 88 of the distance H between the actual measurement start position 84 and the actual measurement end position 86 in the rotation axis center Ax direction is divided into five segments, namely h1, h2, h3, h4, and h5. Here, in the present embodiment, h1=h2=h3=h4=h5. The control device 4 estimates that the pattern 90 can be moved without gaps by making five passes from the actual measurement start position 84 to the actual measurement end position 86.

Next, the control device 4 compares the number of passes resulting from dividing the distance R by a distance r in the radial direction, which is the result calculated in FIG. 23, with the number of passes resulting from dividing the distance H by a distance h in the rotation axis center Ax direction, which is the result calculated in FIG. 25, and calculates the higher number of passes as the number of passes in the rotation direction. Note that the number of rotations is calculated as an integer in which the decimal point is rounded up. Here, the above-described embodiment describes the rotation line velocity as constant and the radial direction movement velocity as variable, and thus the distance h of the pattern 90 in the rotation axis center direction and the distance r of the pattern 90 in the radial direction are constant; however, these distances change depending on conditions. In other words, if the conditions of relative movement differ, the distance h in the rotation axis center direction and the distance r in the radial direction will change depending on the position in the radial direction. The control device 4 may adjust a reference for calculating the number of passes based on the distance h in the rotation axis center direction and the distance r in the radial direction in accordance with the conditions of relative movement.

Although in FIGS. 21 to 25, a line orthogonal to the rotation axis and a line parallel to the rotation axis are used as a line substantially intersecting with the rotation axis or a line parallel to the rotation axis used when finding the length of the projection component of the pattern and a line substantially intersecting with the rotation axis or a line parallel to the rotation axis used when finding the length when the positions of the actual measurement region closest to and farthest from the rotation axis center are projected, the embodiment is not limited thereto. While a variety of lines can be used as the line intersecting with the rotation axis or the line parallel to the rotation axis, it is possible that the lines be in a common cylindrical plane, conical plane, or plane orthogonal to the rotation axis. Through this, the number of rotations can be calculated at a high level of accuracy, and a more favorable path can be set as the measurement path. With respect to the line substantially intersecting with the rotation axis Ax, even if the rotation axis Ax and the line on which the pattern is projected are in a twisted relationship, it is sufficient for a distance between the rotation axis Ax and the line on which the pattern is projected to be no greater than 100 times the length of the line light in the longer direction. No greater than 10 times is possible, no greater than 1 time is further possible, no greater than 0.1 times is further possible, no greater than 0.01 times is further possible, and no greater than 0.001 times is further possible.

Next, the rotation line velocity is constant, the rotational velocity is constant or the rotational velocity is variable, the radial direction movement velocity is variable, and the sampling interval is constant in the shape measurement device 1 according to the embodiment as described above, but is not limited thereto. The rotation line velocity, the rotational velocity, the radial direction movement velocity, and the sampling interval may each be set to be variable or to be constant. By setting the sampling interval to be constant, the shape measurement device 1 can ensure the same controllable range for controlling exposure by the optical probe 3 during measurement, at any position. Meanwhile, by setting the rotation line velocity to be constant, the shape measurement device 1 can make the pattern interval constant on the object to be measured in the rotation direction. Although it is possible that the rotation line velocity be constant in the shape measurement device 1, the rotation line velocity may fluctuate.

Note that in the case where the relative movement velocity at which the object to be measured Ma and the optical probe 3 move in the radial direction is variable as described in the present embodiment, it is possible that the shape measurement device 1 set the relative movement velocity to be lower toward the outer side in the radial direction than on the inner side in the radial direction so that the rotation line velocity at which the pattern moves relative to the object to be measured is constant.

In addition, in the case where the shape measurement device 1, in the case where the relative movement velocity at which the object to be measured Ma and the optical probe 3 move in the radial direction is variable, it is possible that the shape measurement device 1 set the rotation line velocity at which the object to be measured Ma and the optical probe 3 rotate relative to each other to be constant, as in the present embodiment. Specifically, it is possible that the movement mechanism 2 be controlled so that the relative movement velocity at which the object to be measured and the optical probe move in the radial direction is lower toward the outer side in the radial direction than on the inner side in the radial direction, and so that the rotational velocity of the object to be measured and the probe be set so that the rotation line velocity is constant. Through this, the rotation can be kept to a constant velocity, and the measurement accuracy can be improved.

Meanwhile, the shape measurement device 1 may set the rotation line velocity at which the pattern 90 moves relative to the object to be measured Ma to be constant and set the relative movement velocity at which the object to be measured Ma and the optical probe 3 move in the radial direction to be constant. In this case, by making the rotational velocity variable and increasing that velocity as the position of the object to be measured Ma on which the pattern is projected approaches the rotation axis center Ax, the shape measurement device 1 sets the rotation line velocity at which the pattern moves relative to the object to be measured Ma to be constant.

In addition, the shape measurement device 1 sets the relative movement velocity at which the object to be measured Ma and the optical probe 3 move in the radial direction to a velocity at which an amount of overlap between the pattern 90 when moving along the outermost pass in the radial direction and the pattern when moving along one pass inward from the outermost pass in the radial direction is a set value. Through this, setting the rotational velocity using the outer side in the radial direction as a reference makes it possible to suppress the rotation line velocity from becoming longer than the set interval, or in other words, to suppress the measurement density from becoming thinner. Meanwhile, the shape measurement device 1 may set the relative movement velocity at which the object to be measured Ma and the optical probe 3 move in the radial direction to a velocity at which an amount of overlap between the pattern when moving along the innermost pass and the pattern when moving along one pass outward from the innermost pass is a set value. In addition, it is possible that the shape measurement device 1 set the relative movement velocity at which the object to be measured Ma and the optical probe 3 move in the radial direction to a velocity at which an amount of overlap between the pattern 90 when moving along the outermost pass in the radial direction and the pattern when moving along one pass inward from the outermost pass in the radial direction or an amount of overlap between the pattern when moving along the innermost pass and the pattern when moving along one pass outward from the innermost pass is a set value. Through this, the amount of overlap can be set in accordance with the shorter of the lengths at which the line-shaped pattern is projected, and gaps can be prevented from arising between a line-shaped pattern and the line-shaped pattern of a pass adjacent thereto. Here, in the case where the object to be measured is a type of gear, a radial direction movement path for moving along the tooth trace often has a shape that curves in one direction, as indicated in FIG. 24. As such, the length at which the line-shaped pattern is projected gradually changes. Accordingly, setting the relative movement velocity using the pattern of the outermost pass or the innermost pass as a reference makes it possible to set the relative movement velocity in accordance with the shorter of the lengths at which the line-shaped pattern is projected and therefore to suppress gaps from arising between the line-shaped patterns.

In this manner, in the case where the shape measurement device 1 calculates the number of passes under conditions where the rotational velocity is set to be variable and the rotation line velocity and the radial direction movement velocity are set to be constant, the distance h in the rotation axis center direction and the distance r in the radial direction become shorter toward the outer side in the radial direction. In this case, it is possible that the shape measurement device calculate the number of passes by dividing the distance H by the distance h on the outermost side in the radial direction, and calculate the number of passes by dividing the distance R by the distance r on the outermost side in the direction. Accordingly, although more of the patterns will overlap in the radial direction as the patterns progress inward in the radial direction, gaps can be suppressed from arising between the patterns in the radial direction.

Meanwhile, the shape measurement device 1 may set the rotation angular velocity at which the object to be measured M and the optical probe 3 rotate relative to each other to be constant and set the relative movement velocity at which the object to be measured Ma and the optical probe 3 move in the radial direction to be constant. Setting the rotation angular velocity and the relative movement velocity to be constant in this manner makes it possible to perform the movement by the movement mechanism, namely the probe movement device 2 and the holding/rotating device 7 in the present embodiment at a constant velocity. The measurement can be stabilized as a result. Note that the rotation line velocity can be set to be constant in this case by setting the sampling interval to be variable.

The shape measurement device 1 according to the present embodiment sets the measurement path to a continuous path, or in other words, sets the measurement path to a single drawn line so that the measurement can be carried out efficiently, but is not limited thereto. The shape measurement device 1 according to the present embodiment may employ a path formed of a plurality of circles having different diameters disposed in the radial direction as the measurement path. In this case, the shape measurement device 1 rotates the objects to be measured M and Ma and the pattern 90 relative to each other with their positions in the radial direction remaining fixed, and after one pass is measured, moves the objects to be measured M and Ma and the pattern 90 relative to each other in the radial direction and takes a measurement, and repeats the operation of moving the objects to be measured M and Ma and the pattern 90 relative to each other in the radial direction after one pass is measured.

It is possible that the movement mechanism of the shape measurement device 1 rotate the object to be measured as in the present embodiment. The rotation can be stabilized as a result.

It is possible that the movement mechanism of the shape measurement device 1 be able to move the optical probe 3 and the objects to be measured M and Ma relative to each other in the first direction, a second direction orthogonal to the first direction, and a third direction orthogonal to a plane formed by the first direction and the second direction, and that the radial direction be included in the plane formed by the first direction and the second direction, as in the present embodiment. The relative positions can be moved in any desired direction as a result.

Here, it is possible that the movement mechanism include the holding/rotating device 7 (rotation mechanism) that rotates the object to be measured M and the optical probe 3 relative to each other and the probe movement device 2 (linear motion mechanism) that moves the object to be measured M and the optical probe 3 relative to each other in the radial direction, as in the present embodiment. In this case, the measurement path setting unit 36 calculates a movement pitch amount by the linear motion mechanism for when the rotation mechanism makes a single rotation in accordance with the calculated number of rotations of the object to be measured M. In this manner, the shape measurement device 1 includes the rotation mechanism and the linear motion mechanism as the movement mechanism, which makes it possible to separately perform the relative rotational movement and linear movement. As a result, the shape measurement device 1 can simplify the control of the operation of each of the mechanisms. Meanwhile, calculating the movement pitch amount by the linear motion mechanism when the rotation mechanism makes a single rotation in accordance with the calculated number of rotations of the object to be measured makes it possible to specify a relationship between the rotational movement and the linear movement with ease. In addition, the shape measurement device 1 calculates the movement pitch amount by the linear motion mechanism when the rotation mechanism makes a single rotation in accordance with the calculated number of rotations of the object to be measured, which makes it possible to adjust a relationship between the movement amounts of the respective movement mechanisms with ease.

Incidentally, an example in which the line-shaped pattern is projected by the projection optical system 13 of the optical probe 3 has been described, but is not limited thereto. For example, an illumination optical system including an optical system that projects a dot-shaped spot pattern onto the object to be measured M and a deflection scanning mirror that enables the spot pattern to scan along the surface of the object to be measured M in a single direction may be used. In this case, the longer direction of the line-shaped pattern corresponds to a scanning direction of the deflection scanning mirror. Through this, the dot-shaped spot pattern is projected while scanning in at least a linear scanning range, and the interior of the linear scanning range serves as the line-shaped pattern. Accordingly, the measurement start position, the measurement end position, and the like can be corrected on the basis of the direction and the scanning range the deflection scanning mirror is capable of scanning in. Meanwhile, the length of the longer direction of the line light is synonymous with the length of a longer direction of the linear scanning range with respect to an optical probe having the deflection scanning mirror, and thus this can be handled by estimating a length of pattern 90 from one end portion of the scanning range to the other end portion of the scanning range rather than estimating the length of the pattern 90 in the radial direction. In addition, the movement amount of the probe movement device 2 per single rotation can also be determined on the basis of the direction and range in which the deflection scanning mirror can scan along the object to be measured M.

Second Embodiment

Figure 26:
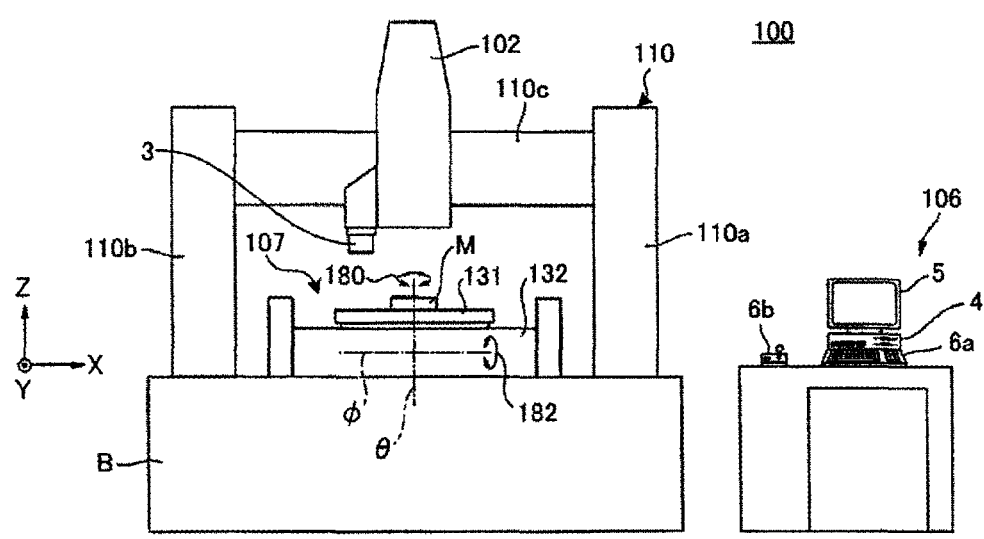
FIG. 26 is a schematic view of the configuration of the shape measurement device according to a second embodiment.

Next, a second embodiment of the shape measurement device will be described with reference to FIG. 26. FIG. 26 is a schematic view of the configuration of the shape measurement device according to the second embodiment. A shape measurement device 100 illustrated in FIG. 26 has the same configuration as the shape measurement device 1 according to the first embodiment, aside from a movement mechanism that moves the object to be measured M and the position of the illumination light flux L (pattern) relative to each other. Of the constituent elements of the shape measurement device 100, elements identical to the constituent elements of the shape measurement device 1 will be given the same reference numerals, and descriptions thereof will be omitted.

The shape measurement device 100 includes a probe movement device 102, an optical probe 3, a control device 4, a display device 5, an input device 106, and a holding/rotating device 107.

The probe movement device 102 includes a moving unit 110. The moving unit 110 is provided so as to freely move in the Y direction upon guide rails thereof, and includes a supporting post 110a and a horizontal frame 110c that spans horizontally between the supporting post 110a and a supporting post 110b that forms a pair with the supporting post 110a, which forms a gate-shaped structure. The moving unit 110 also includes a carriage provided on the horizontal frame 110c so as to freely move in the X direction (a left-right direction). The moving unit 110 holds the optical probe 3 so that to freely move in the Z direction relative to the carriage. The moving unit 110 also includes, between the carriage and the optical probe 3, a head rotation mechanism that rotates the optical probe 3 around an axis parallel to the Z-axis direction.

The holding/rotating device 107 is disposed on the base B. The holding/rotating device 107 includes a stage 131 and a support table 132. The stage 131 has the object to be measured M placed thereon and holds the object to be measured M. The support table 132 supports the stage 131 so as to be capable of rotating around rotation axes in two orthogonal directions, and thus tilts or horizontally rotates the stage 131 relative to a reference surface. The support table 132 according to the present embodiment supports the stage 131 so as to be capable of rotating in the direction of an arrow 180 indicated in FIG. 26 within a horizontal plane central to a rotation axis θ extending vertically (in the Z-axis direction) and capable of rotating in the direction of an arrow 182 indicated in FIG. 26 central to a rotation axis (p extending horizontally (in the X-axis direction), for example.

Meanwhile, the holding/rotating device 107 is provided with a stage driving unit that rotationally drives the stage 131 under electric power around the rotation axis θ and the rotation axis φ on the basis of inputted a driving signal, and a stage position detection unit that detects coordinates of the stage 131 and outputs a signal indicating stage coordinate values.

The shape measurement device 100 includes a mechanism that rotates the holding/rotating device 107 around the rotation axis φ, and operates the holding/rotating device 107 to adjust the relative position of the object to be measured M and the pattern around the rotation axis φ. In other words, the shape measurement device 100 includes a mechanism that adjusts the orientation of the pattern as a part of the holding/rotating device 107.

Like the shape measurement device 1, the shape measurement device 100 carries out measurement through movement in the radial direction while relatively rotating the object to be measured M and the pattern on the basis of the measurement path, which makes it possible to achieve the same effects as the shape measurement device 1.

However, the shape measurement device is not limited to the shape measurement device 1 or 100, and various combinations can be employed as mechanisms for moving in the radial direction while relatively rotating the object to be measured M and the pattern. It is sufficient for the shape measurement device to be capable of movement in the radial direction while relatively rotating the object to be measured M and the pattern, and thus either of the optical probe 3 and the object to be measured M may be capable of moving in the X-axis, Y-axis, and Z-axis directions, and may be rotated around the X-axis, Y-axis, and Z-axis directions.

Figure 27:
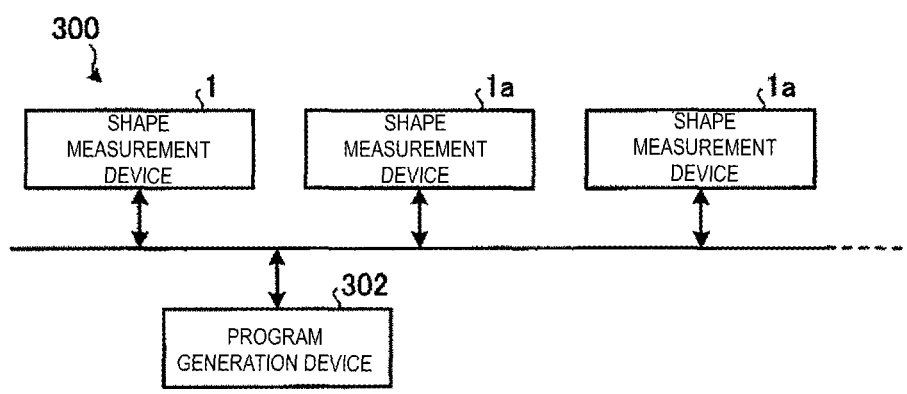
FIG. 27 is a schematic diagram illustrating the configuration of a system including a shape measurement device.

Although the shape measurement devices 1 and 100 of the aforementioned embodiments carry out processing using a single apparatus, a plurality of apparatuses may be combined instead. FIG. 27 is a schematic view illustrating the configuration of a system having a shape measurement device. Next, a shape measuring system 300 including shape measurement devices will be described using FIG. 27. The shape measuring system 300 includes the shape measurement device 1, a plurality (two in the drawing) of shape measurement devices 1a, and a program generating device 302. The shape measurement devices 1 and 1a and the program generating device 302 are connected by a wired or wireless communication line. Aside from not including the initial measurement range setting unit 33, the shape measurement devices 1a have the same configuration as the shape measurement device 1. The program generating device 302 generates various settings, programs, and the like created by the control device 4 of the shape measurement device 1 as described above. Specifically, the program generating device 302 generates the initial measurement range, the shape measurement program, a measurement program for the entire measurement target range, a measurement program for the surface of a single tooth, and the like. The program generating device 302 outputs the generated programs, data, and the like to the shape measurement devices 1 and 1a. The shape measurement devices 1a acquire the initial measurement range, the shape measurement program, the measurement program for the entire measurement target range, the measurement program for the surface of a single tooth, and the like from the shape measurement device 1, the program generating device 302, or the like, and carry out processing using the acquired data and programs. The shape measuring system 300 can effectively apply the generated data and programs by causing the shape measurement device 1 to execute the measurement programs, causing the shape measurement devices 1a to take measurements using the data and programs generated by the program generating device 302 and the like. Meanwhile, the shape measurement devices 1a can take measurements even without having the initial measurement range setting unit 33 and elements that make other settings as well.

Figure 28:
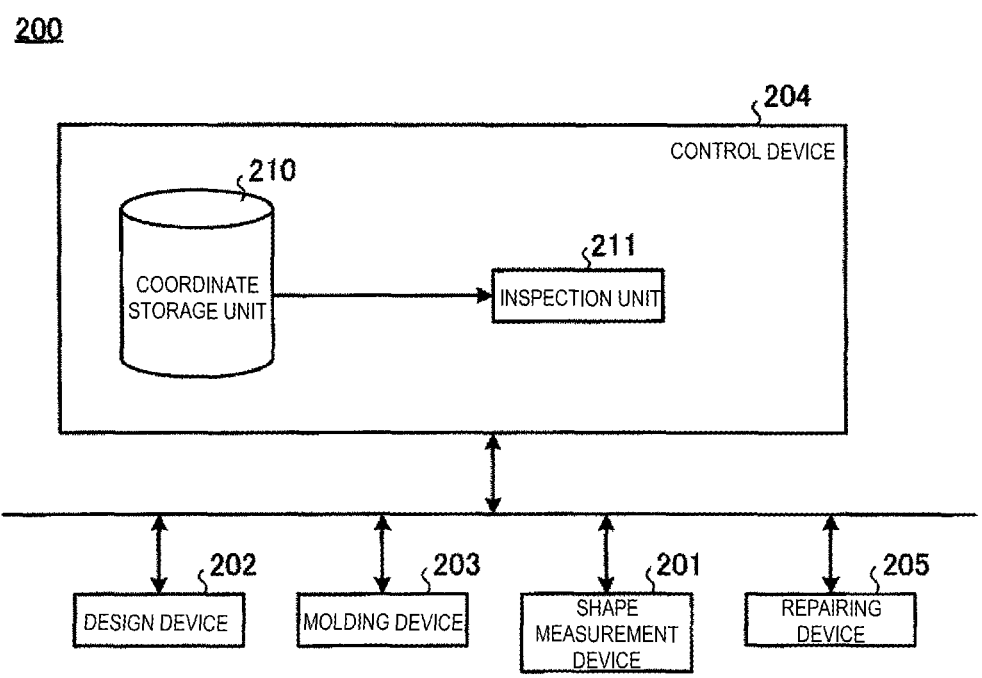
FIG. 28 is a diagram illustrating the configuration of a structural object production system according to the present embodiment.

Next, a structural object production system including the aforementioned shape measurement device will be described with reference to FIG. 28. FIG. 28 is a block configuration diagram illustrating the structural object production system. A structural object production system 200 according to the present embodiment includes a shape measurement device 201 such as that described in the aforementioned embodiments, a design device 202, a molding device 203, a control device (inspection device) 204, and a repairing device 205. The control device 204 includes a coordinate storage unit 210 and an inspection unit 211.

The design device 202 generates design information regarding a shape of a structure, and sends the generated design information to the molding device 203. The design device 202 stores the generated design information in the coordinate storage unit 210 of the control device 204. The design information includes information expressing coordinates of each of positions on the structure.

The molding device 203 forms the above-described structure on the basis of the design information inputted from the design device 202. The molding performed by the molding device 203 includes casting, forging, cutting, and the like, for example. The shape measurement device 201 measures the coordinates of the structure (measurement target) that has been formed, and sends information expressing the measured coordinates (the shape information) to the control device 204.

The coordinate storage unit 210 of the control device 204 stores the design information. The inspection unit 211 of the control device 204 reads out the design information from the coordinate storage unit 210. The inspection unit 211 compares the information expressing the coordinates received from the shape measurement device 201 (the shape information) with the design information read out from the coordinate storage unit 210. The inspection unit 211 then determines, on the basis of the comparison result, whether or not the structure has been formed according to the design information. In other words, the inspection unit 211 determines whether or not the structure that has been created is a non-defective product. In the case where the structure has not been formed according to the design information, the inspection unit 211 determines whether or not the structure can be repaired. In the case where the structure can be repaired, the inspection unit 211 calculates a defective area and a repair amount on the basis of the comparison result, and sends information expressing the defective area and information expressing the repair amount to the repairing device 205.

The repairing device 205 machines the defective area of the structure on the basis of the information expressing the defective area and the information expressing the repair amount received from the control device 204.

Figure 29:
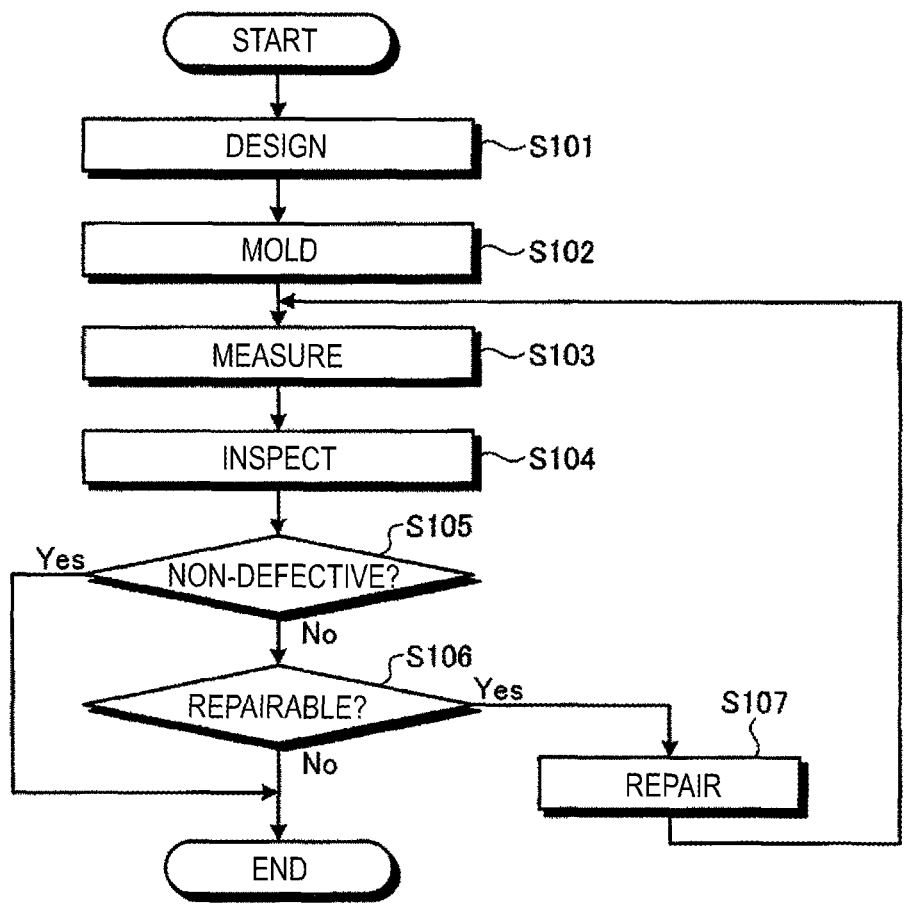
FIG. 29 is a flowchart illustrating a structural object production method according to the present embodiment.

FIG. 29 is a flowchart illustrating the flow of processing performed by the structural object production system. In the structural object production system 200, first, the design device 202 generates the design information regarding the shape of the structure (step S101). Next, the molding device 203 forms the above-described structure on the basis of the design information (step S102). Next, the shape measurement device 201 measures the shape of the structure that has been formed (step S103). Next, the inspection unit 211 of the control device 204 inspects whether or not the structure has been formed according to the design information by comparing the shape information acquired by the shape measurement device 201 with the above-described design information (step S104).

Next, the inspection unit 211 of the control device 204 determines whether or not the created structure is non-defective (step S105). In the case where the inspection unit 211 has determined that the created structure is a non-defective product (Yes in step S105), the structure manufacturing system 200 terminates the processing. In the case where the inspection unit 211 has determined that the created structure is not a non-defective product (No in step S105), the inspection unit 211 determines whether or not the created structure can be repaired (step S106).

In the case where the inspection unit 211 has determined that the created structure can be repaired (Yes in step S106), the repairing device 205 machines the structure again (step S107) and the structural object production system 200 returns the processing to step S103. In the case where the inspection unit 211 has determined that the created structure cannot be repaired (No in step S106), the structural object production system 200 terminates the processing. The structural object production system 200 completes the processing illustrated in the flowchart of FIG. 29 in this manner.

According to the structural object production system 200 of the present embodiment, the shape measurement device according to the aforementioned embodiments can measure coordinates of the structure at a high level of accuracy, and thus it can be determined whether or not the created structure is a non-defective product. Furthermore, the structural object production system 200 can machine the structure again and repair the structure in the case where the structure is defective.

Note that the repair process executed by the repairing device 205 in the present embodiment may be replaced with a process of the molding device 203 re-executing a molding process. Here, the molding device 203 re-executes the molding process (forging, cutting, and the like) in the case where the inspection unit 211 of the control device 204 has determined that the structure can be repaired. Specifically, for example, the molding device 203 cuts a portion of the structure that is originally supposed to have been cut but that has not actually been cut. The structural object production system 200 can create the structure accurately as a result.

Although preferred embodiments of the present teaching have been described with reference to the appended drawings, it goes without saying that the present teaching is not limited to these examples. The forms, combinations, and the like of the various constituent elements described in the aforementioned embodiments are merely examples, and many variations based on design requirements and the like are possible without departing from the essential spirit of the present teaching.

For example, although the aforementioned embodiments describe exemplary configurations in which the holding member 55 of the shape measurement device 1 holds the optical probe 3 in a cantilever state, the present teaching is not limited thereto, and the configuration may be such that the optical probe 3 is held on both sides thereof. Holding the optical probe 3 on both sides thereof makes it possible to reduce deformation arising when the holding member 55 rotates, which in turn makes it possible to increase the measurement accuracy.

Furthermore, although the aforementioned embodiments describe the optical probe 3 projecting line light as the illumination light flux L and capturing an image of the line-shaped pattern reflected by the object to be measured, the optical probe 3 is not limited to such a form. The illumination light emitted from the optical probe 3 may have a form in which the light is projected onto a predetermined plane all at once. For example, the method disclosed in U.S. Pat. No. 6,075,605 may be employed. The illumination light emitted from the optical probe may have a form in which a point-shaped spot of light is projected.

In addition, the shape measurement device can be used favorably to measure an object to be measured that has a repeated shape in a circumferential direction and has a non-planar shape extending in a different direction from the circumferential direction, as in the aforementioned embodiments. In this case, it is possible that the initial measurement range be set along a longer direction of one of the repeated shapes of the object to be measured. This makes it possible to set the movement path in the radial direction to an appropriate path. Note that the object to be measured is not limited to having a repeated shape in a circumferential direction and having a non-planar shape extending in a different direction from the circumferential direction; the object to be measured may have a variety of shapes, including a shape that does not have a repeated shape, for example.

The invention claimed is:

1. A shape measurement device that measures a shape of an object to be measured, the device comprising:
    a probe including:
    a projection optical system that projects, onto a surface of the object to be measured, a line-shaped pattern, or a spot pattern while scanning in at least a linear scanning range; and
    an image capturing device that detects an image of the pattern projected onto the object to be measured;
    a movement mechanism including a rotational movement mechanism which performs a relative rotational movement in which the rotational movement mechanism rotates the object to be measured relative to the probe around a rotation axis, and a linear movement mechanism which performs a relative linear movement in which the linear movement mechanism linearly moves at least one of the probe and the object to be measured relatively in a radial direction that intersects with a rotation direction of the relative rotational movement, wherein the movement mechanism performs the relative rotational movement of the rotational movement mechanism and the relative linear movement of the linear movement mechanism simultaneously;
    a measurement region setting controller that sets a measurement region on the surface of the object to be measured; and
    an actual measurement region setting controller that is connected to the measurement region setting controller communicably and that sets an actual measurement region including an actual measurement start position on the surface of the object to be measured and an actual measurement end position on the surface of the object to be measured on the basis of the measurement region set by the measurement region setting controller, wherein
    the actual measurement region setting controller sets whichever of the actual measurement start position and the actual measurement end position is closer to a rotation axis to be closer to the rotation axis than the measurement region, and
    the actual measurement region setting controller sets whichever of the actual measurement start position and the actual measurement end position is positioned further outward in a radial direction that intersects with a rotation direction of the relative rotational movement to be further from the rotation axis than the measurement region.

2. The shape measurement device according to claim 1, wherein
    the actual measurement region setting controller sets the actual measurement region on an outer side of the measurement region on the basis of a difference between distances between a near region and a far region of the line-shaped pattern or the linear scanning region relative to the rotation axis.

3. The shape measurement device according to claim 1, wherein
    on the basis of a difference between distances between a near region and a far region of the line-shaped pattern or the linear scanning region relative to the rotation axis,
    the actual measurement region setting controller sets whichever of the actual measurement start position and the actual measurement end position is closer to a rotation axis center to be closer to the rotation axis than the measurement region, or
    the actual measurement region setting controller sets whichever of the actual measurement start position and the actual measurement end position is positioned further outward in the radial direction to be positioned further from the rotation axis than the measurement region.

4. The shape measurement device according to claim 1 further comprising a movement mechanism controller that is connected to the movement mechanism communicably and that controls the movement mechanism, wherein
    the controller controls the movement mechanism in accordance with a relative positional relationship between the pattern or the linear scanning range while the pattern is projected onto the object to be measured and the rotation axis.

5. The shape measurement device according to claim 1, wherein
    the movement mechanism controller controls a movement amount by which the object to be measured and the probe move relative to each other in a direction intersecting the rotation direction in accordance with a direction of the line-shaped pattern or the longer direction of the linear scanning range set on the basis of a projection position of the line-shaped pattern on the object to be measured or a position of the linear scanning range on the object to be measured.

6. The shape measurement device according to claim 1, wherein
a difference between the near region and the far region of the pattern or the linear scanning range relative to the rotation axis is acquired from a difference between respective distances from one end portion and another end portion in the longer direction of the pattern projected onto the object to be measured or the scanning range to the rotation axis.

7. The shape measurement device according to claim 6, wherein
a line substantially intersecting with the rotation axis or a line parallel to the rotation axis used when finding a projected length of one of the pattern and the linear scanning range, and a line substantially intersecting with the rotation axis or a line parallel to the rotation axis used when finding a length when the positions of the actual measurement region closest to and farthest from the rotation axis center are projected, are in a common cylindrical plane, conical plane, or plane orthogonal to the rotation axis.

8. The shape measurement device according to claim 6 wherein
a projected length of the pattern or the linear scanning range is acquired from a difference between respective distances from one end portion and another end portion in the longer direction of the pattern projected onto the object to be measured to the rotation axis.

9. The shape measurement device according to claim 6, wherein
under a condition that an angle formed between a straight line passing through the pattern or the scanning range and substantially intersecting with the rotation axis or a straight line parallel to the rotation axis and the pattern or the linear scanning range is represented by θ, a projected length of the pattern or the linear scanning range is a length calculated by multiplying the length of the pattern projected onto the object to be measured or the length of the linear scanning range by cos θ.

10. The shape measurement device according to claim 1, wherein
the object to be measured has a repeated shape in a circumferential direction and a non-planar shape extending in a different direction from the circumferential direction; and
the region of part of the object to be measured is set to follow a longer direction of one of the repeated shapes of the object to be measured.

11. The shape measurement device according to claim 1, wherein
the controller causes the probe to acquire an image of the pattern at a set sampling interval and moves the probe and the object to be measured relative to each other at a rotation angular velocity for rotating the object to be measured and the probe relative to each other and a relative movement velocity for moving the object to be measured and the probe in the radial direction so that a movement distance by which the pattern moves relative to the object to be measured at the sampling interval is constant.

12. A structural object production system comprising:
a molding device that molds a structure on the basis of design information regarding a shape of the structure;
the shape measurement device described in claim 1, that measures the shape of the structure molded by the molding device; and
a control device that compares shape information expressing the shape of the structure measured by the shape measurement device with the design information.

13. The shape measuring device according to claim 1, further comprising a controller that controls the movement mechanism to perform, from the actual measurement start position to the actual measurement stop position, the relative rotational movement of the rotational movement mechanism and the relative linear movement of the linear movement mechanism simultaneously.

14. A shape measurement device that measures a shape of an object to be measured, the device comprising:
a probe including:
a projection optical system that projects a line-shaped pattern onto a surface of the object to be measured, the line-shaped pattern being generated by adjusting an intensity distribution of light emitted from a light source or by scanning light emitted from a light source; and
an image capturing device that detects an image of the line-shaped pattern projected onto the object to be measured;
a movement mechanism that rotates the object to be measured and the probe relative to each other so that the object to be measured rotates relative to the probe around a rotation axis and that linearly moves at least one of the probe and the object to be measured relatively in at least a radial direction that intersects with a rotation direction of the relative rotational movement; and
a controller that is connected to the movement mechanism communicably and that controls the movement mechanism so that the movement mechanism rotates the object to be measured and the probe relative to each other, and linearly moves at least one of the probe and the object to be measured relatively, simultaneously,
wherein, while the movement mechanism relatively rotates the object with respect to the probe, the controller controls a maximum optical probe movement amount per single rotation in accordance with an angle of tilt between the orientation of the line-shaped pattern and a line perpendicular to the rotation direction in a measurement plane of the object to be measured.

15. The shape measurement device according to claim 14, wherein
under a condition that the object to be measured has rotated by a predetermined angle relative to the probe, the controller calculates a relative movement amount of the object to be measured and the probe in an intersecting direction in accordance with a relative positional relationship between the rotation axis and the line-shaped pattern.

16. The shape measurement device according to claim 15, wherein
the controller controls the movement mechanism on basis of a difference between positions of the near region and the far region of the line-shaped pattern while the pattern is projected onto the object to be measured relative to the rotation axis.

17. The shape measurement device according to claim 16, wherein the controller sets the near region to a position of a part of the line-shaped pattern that is closest to the rotation axis while the pattern is projected onto the object to be measured, and sets the far region to a position of a part of the line-shaped pattern that is furthest from the rotation axis while the pattern is projected onto the object to be measured.

18. The shape measurement device according to claim 14, wherein
the controller calculates a number of rotations by the movement mechanism required to measure an actual measurement region of the object to be measured in accordance with a length of the line-shaped pattern while the pattern is projected onto the object to be measured and a length between positions of the actual measurement region of the object to be measured that are closest to and farthest from the rotation axis.

19. The shape measurement device according to claim 18, wherein
the movement mechanism includes:
a rotation mechanism that rotates the object to be measured and the probe relative to each other; and
a linear motion mechanism that moves the object to be measured and the probe relative to each other in the radial direction; and
the controller sets a movement pitch amount by the linear motion mechanism while the rotation mechanism makes a single rotation, in accordance with the calculated number of rotations for the object to be measured.

20. The shape measurement device according to claim 19, wherein
the controller includes an actual measurement region setting controller that sets the actual measurement region including the actual measurement start position on the surface of the object to be measured and the actual measurement end position on the surface of the object to be measured on the basis of an initial measurement range set in order to measure a region of part of the shape of the object to be measured; and
the actual measurement region setting controller sets the position of whichever of the actual measurement start position and the actual measurement end position is set closer to the rotation axis to be closer to the rotation axis than a measurement position closest to the rotation axis while measuring the region of the part of the object to be measured in the initial measurement range, and sets the position of whichever of the actual measurement start position and the actual measurement end position is set on an outer side in the radial direction to be further outside in the radial direction than a measurement position farthest from the rotation axis while measuring the region of the part of the object to be measured.

21. The shape measurement device according to claim 18, further comprising an information indicator that notifies a user of information, wherein
when a measurement time or the number of rotations for measuring the shape of the object to be measured is outside a range of tolerance, the controller makes a notification of information indicating that the measurement time or the number of rotations is outside the range of tolerance from the information indicator.

22. The shape measurement device according to claim 18, wherein
the controller displays a measurement time for measuring the shape of the object to be measured calculated on the basis of the set number of rotations in a display.

23. The shape measurement device according to 6 wherein
the controller sets a rotation line velocity at which the pattern moves relative to the object to be measured to be constant and sets a relative movement velocity at which the object to be measured and the probe move in the radial direction to be constant.

24. The shape measurement device according to claim 23, wherein
the controller sets the relative movement velocity at which the object to be measured and the probe move in the radial direction to a velocity at which an amount of overlap between the pattern when moving along an outermost pass in the radial direction and the pattern while moving along one pass inward from the outermost pass in the radial direction or an amount of overlap between the pattern when moving along an innermost pass and the pattern while moving along one pass outward from the innermost pass is a set value.

25. The shape measurement device according to claim 14, wherein
the controller controls the movement mechanism so that the relative movement velocity at which the object to be measured and the probe move in the radial direction is lower toward an outer side in the radial direction than on an inner side in the radial direction, and so that the rotational velocity of the object to be measured and the probe be set so that the rotation line velocity is constant.

26. The shape measuring device according to claim 14, wherein the controller is configured to control the amount of the relative movement between the object and the probe, based on
(a) a distance between the rotation axis and a near-region of the linear-shaped pattern or the linear scanning range, and a distance between the rotation axis and a far-region of the linear-shaped pattern or the linear scanning range,
wherein the near-region is a region of the linear-shaped pattern or the linear scanning range that is near to the rotation axis, and the far-region is another region of the linear-shaped pattern or the linear scanning range that is far from the rotation axis.

27. A shape measurement method for measuring a shape of an object to be measured by irradiating a surface of the object to be measured with a line-shaped pattern from a probe or projecting a spot pattern from the probe while scanning in at least a linear scanning range and causing the probe to detect an image of the pattern projected onto the object to be measured, the method comprising:
rotating the object to be measured and the probe relative to each other so that the object to be measured rotates relative to the probe around a rotation axis and linearly moving at least one of the probe and the object to be measured relatively in a radial direction that intersects with a rotation direction of the relative rotational movement;
setting a measurement region on the surface of the object to be measured;
setting an actual measurement region including an actual measurement start position on the surface of the object to be measured and an actual measurement end position on the surface of the object to be measured on the basis of the measurement region; and
setting whichever of the actual measurement start position and the actual measurement end position is closer to a rotation axis to be closer to the rotation axis than the measurement region, and setting whichever of the actual measurement start position and the actual measurement end position is located further outward in the radial direction to be further from the rotation axis than the measurement region.

28. A structural object production method comprising: molding a structure on the basis of design information regarding a shape of the structure; measuring the shape of the molded structure using the shape measurement method described in claim 27; and comparing shape information expressing the measured shape of the structure with the design information.

29. The shape measuring method according to claim 27, wherein, from the actual measurement start position to the actual measurement stop position, rotating the object to be measured and the probe relative to each other and linearly moving at least one of the probe and the object to be measured relatively in the radial direction, are performed simultaneously.

30. A shape measurement method for measuring a shape of an object to be measured by irradiating a surface of the object to be measured with a line-shaped pattern, which is generated by adjusting an intensity distribution of light emitted from a light source or by scanning light emitted from a light source and causing the probe to detect an image of the line-shaped pattern projected onto the object to be measured, the method comprising:
   rotating the object to be measured and the probe relative to each other so that the object to be measured rotates relative to the probe around a rotation axis and linearly moving at least one of the probe and the object to be measured relatively in at least a radial direction that intersects with a rotation direction of the relative rotational movement; and
   controlling a movement mechanism for moving the probe relative to the object such that a maximum optical probe movement amount per single rotation is controlled in accordance with an angle of tilt between the orientation of the line-shaped pattern and a line perpendicular to the rotation direction in a measurement plane of the object to be measured.

31. The shape measurement method according to claim 30, wherein the amount of the relative movement between the object and the probe is controlled based on
   (a) a distance between the rotation axis and a near-region of the linear-shaped pattern or the linear scanning range, and a distance between the rotation axis and a far-region of the linear-shaped pattern or the linear scanning range,
   wherein the near-region is a region of the linear-shaped pattern or the linear scanning range that is near to the rotation axis, and the far-region is another region of the linear-shaped pattern or the linear scanning range that is far from the rotation axis.

32. A non-transitory computer readable medium storing shape measurement program for measuring a shape of an object to be measured by irradiating a surface of the object to be measured with a line-shaped pattern from a probe or projecting a spot pattern from the probe while scanning in at least a linear scanning range and causing the probe to detect an image of the pattern projected onto the object to be measured, the program causing a computer to execute:
   rotating the object to be measured and the probe relative to each other so that the object to be measured rotates relative to the probe around a rotation axis and linearly moving at least one of the probe and the object to be measured relatively in a radial direction that intersects with a rotation direction of the relative rotational movement;
   setting a measurement region on the surface of the object to be measured;
   setting an actual measurement region including an actual measurement start position on the surface of the object to be measured and an actual measurement end position on the surface of the object to be measured on the basis of the measurement region; and
   setting whichever of the actual measurement start position and the actual measurement end position is closer to a rotation axis to be closer to the rotation axis than the measurement region, and setting whichever of the actual measurement start position and the actual measurement end position is located further outward in the radial direction to be further from the rotation axis than the measurement region.

33. The non-transitory computer readable medium according to claim 32, wherein, from the actual measurement start position to the actual measurement stop position, rotating the object to be measured and the probe relative to each other and linearly moving at least one of the probe and the object to be measured relatively in the radial direction, are performed simultaneously.

34. A non-transitory computer readable medium storing shape measurement program for measuring a shape of an object to be measured by irradiating a surface of the object to be measured with a line-shaped pattern, which is generated by adjusting an intensity distribution of light emitted from a light source or by scanning light emitted from a light source, and causing the probe to detect an image of the line-shaped pattern projected onto the object to be measured, the program causing a computer to execute:
   rotating the object to be measured and the probe relative to each other so that the object to be measured rotates relative to the probe around a rotation axis and linearly moving at least one of the probe and the object to be measured relatively in at least a radial direction that intersects with a rotation direction of the relative rotational movement; and
   controlling a movement mechanism for moving the probe relative to the object such that a maximum optical probe movement amount per single rotation is controlled in accordance with an angle of tilt between the orientation of the line-shaped pattern and a line perpendicular to the rotation direction in a measurement plane of the object to be measured.

35. The non-transitory computer readable medium according to claim 34, wherein the amount of the relative movement between the object and the probe is controlled based on
   (a) a distance between the rotation axis and a near-region of the linear-shaped pattern or the linear scanning range, and a distance between the rotation axis and a far-region of the linear-shaped pattern or the linear scanning range,
   wherein the near-region is a region of the linear-shaped pattern or the linear scanning range that is near to the rotation axis, and the far-region is another region of the linear-shaped pattern or the linear scanning range that is far from the rotation axis.

36. A structural object production method comprising: molding a structure on the basis of design information regarding a shape of the structure; measuring the shape of the molded structure using the shape measurement method described in claim 30; and comparing shape information expressing the measured shape of the structure with the design information.

\* \* \* \* \*